United States Patent
Hui et al.

(10) Patent No.: US 7,346,175 B2
(45) Date of Patent: Mar. 18, 2008

(54) SYSTEM AND APPARATUS FOR SPEECH COMMUNICATION AND SPEECH RECOGNITION

(75) Inventors: Siew Kok Hui, Singapore (SG); Kok Heng Loh, Singapore (SG); Yean Ming Lau, Singapore (SG)

(73) Assignee: Bitwave Private Limited, Singapore (SG)

( * ) Notice: Subject to any disclaimer, the term of this patent is extended or adjusted under 35 U.S.C. 154(b) by 505 days.

(21) Appl. No.: 10/487,229

(22) PCT Filed: Jul. 2, 2002

(86) PCT No.: PCT/SG02/00149

§ 371 (c)(1),
(2), (4) Date: Feb. 26, 2004

(87) PCT Pub. No.: WO03/036614

PCT Pub. Date: May 1, 2003

(65) Prior Publication Data

US 2004/0193411 A1 Sep. 30, 2004

(30) Foreign Application Priority Data

Sep. 12, 2001 (SG) .............................. 200105600-1

(51) Int. Cl.
*H04R 1/10* (2006.01)
(52) U.S. Cl. ...................................................... 381/74
(58) Field of Classification Search ................. 381/74, 381/71.1–71.8, 71.11–71.12, 94.1–94.3; 455/41.2, 412; 704/233, 227–228, 231; 379/406.8
See application file for complete search history.

(56) References Cited

U.S. PATENT DOCUMENTS

| 4,025,721 A | 5/1977 | Graupe et al. |
| 4,425,481 A | 1/1984 | Mansgold et al. |
| 4,589,137 A | 5/1986 | Miller |
| 4,628,529 A | 12/1986 | Borth et al. |
| 4,630,304 A | 12/1986 | Borth et al. |
| 4,630,305 A | 12/1986 | Borth et al. |

(Continued)

FOREIGN PATENT DOCUMENTS

EP    WO 00/30264    * 11/1998

(Continued)

OTHER PUBLICATIONS

Rabiner et al., "Fundamentals of Speech Recognition," Prentice Hall, 1993, pp. 77-79 and 183-190.

(Continued)

*Primary Examiner*—Vivian Chin
*Assistant Examiner*—Lao Lun-see
(74) *Attorney, Agent, or Firm*—Greenblum & Bernstein, P.L.C.

(57) ABSTRACT

A headset system is proposed including a headset unit to be worn by a user and having two or more microphones, and a base unit in wireless communication with the headset. Signals received from the microphones are processed using a first adaptive filter to enhance a target signal, and then divided and supplied to a second adaptive filter arranged to reduce interference signals and a third filter arranged to reduce noise. The outputs of the second and third filters are combined, and are be subject to further a processing in the frequency domain. The results are transmitted to a speech recognition engine.

26 Claims, 19 Drawing Sheets

U.S. PATENT DOCUMENTS

| | | |
|---|---|---|
| 4,887,299 A | 12/1989 | Cummins et al. |
| 4,931,977 A | 6/1990 | Klemes |
| 4,956,867 A | 9/1990 | Zurek et al. |
| 5,027,410 A | 6/1991 | Williamson et al. |
| 5,224,170 A | 6/1993 | Waite, Jr. |
| 5,251,263 A * | 10/1993 | Andrea et al. .............. 381/71.6 |
| 5,402,496 A | 3/1995 | Soli et al. |
| 5,412,735 A | 5/1995 | Engebretson et al. |
| 5,471,538 A | 11/1995 | Sasaki et al. |
| 5,475,759 A | 12/1995 | Engebretson |
| 5,557,682 A | 9/1996 | Warner et al. |
| 5,568,519 A | 10/1996 | Baier et al. |
| 5,627,799 A | 5/1997 | Hoshuyama |
| 5,680,467 A | 10/1997 | Hansen |
| 5,687,239 A * | 11/1997 | Inanaga et al. .............. 381/309 |
| 5,694,474 A | 12/1997 | Ngo et al. |
| 5,737,430 A | 4/1998 | Widrow |
| 5,754,665 A | 5/1998 | Hosoi |
| 5,793,875 A | 8/1998 | Lehr et al. |
| 5,825,898 A | 10/1998 | Marash |
| 5,835,607 A | 11/1998 | Martin et al. |
| 5,835,608 A | 11/1998 | Warnaka et al. |
| 5,917,921 A | 6/1999 | Sasaki et al. |
| 5,991,418 A | 11/1999 | Kuo |
| 6,002,776 A | 12/1999 | Bhadkamkar et al. |
| 6,049,607 A | 4/2000 | Marash et al. |
| 6,069,963 A | 5/2000 | Martin et al. |
| 6,072,884 A | 6/2000 | Kates |
| 6,091,813 A | 7/2000 | Harley et al. |
| 6,094,150 A | 7/2000 | Ohinshi et al. |
| 6,097,771 A | 8/2000 | Foschini |
| 6,098,040 A * | 8/2000 | Petroni et al. .............. 704/234 |
| 6,127,973 A | 10/2000 | Choi et al. |
| 6,999,541 B1 * | 2/2006 | Hui .............................. 375/350 |

FOREIGN PATENT DOCUMENTS

| | | |
|---|---|---|
| EP | 0883325 | 12/1998 |
| WO | 00/30264 | 5/2000 |

OTHER PUBLICATIONS

Y. Ephraim et al., IEEE Transactions on Acoustics, Speech, and Signal Processing, vol. ASSP-32, No. 6, Dec. 1984, pp. 1118-1121.

K. Buckley et al., IEEE Transactions on Antennas and Propagation, vol. AP-34, No. 3, Mar. 1986, pp. 311-319.

B. Widrow et al., IEEE Transactions on Antennas and Propagation, vol. AP-30, No. 3, May 1982, pp. 469-478.

B. Widrow et al., Proceedings of the IEEE, Dec. 1967, pp. 2143-2159.

An article entitled "An Alternative Approach to Linearly Constrained Adaptive Beamforming," by L. Griffiths et al., IEEE Transactions on Antennas and Propagation, vol. AP-30, No. 1, Jan. 1982, pp. 27-34.

An article entitled "Speech Enhancement Using Optimal Non-Linear Spectral Amplitude Estimation," by Y. Ephraim et al., Proc. IEEE International Conference Acoustics Speech and Signal Processing (Boston) 1983, pp. 1118-1121, Applicants note that this document is mentioned on p. 41 of the specification of the present application.

* cited by examiner

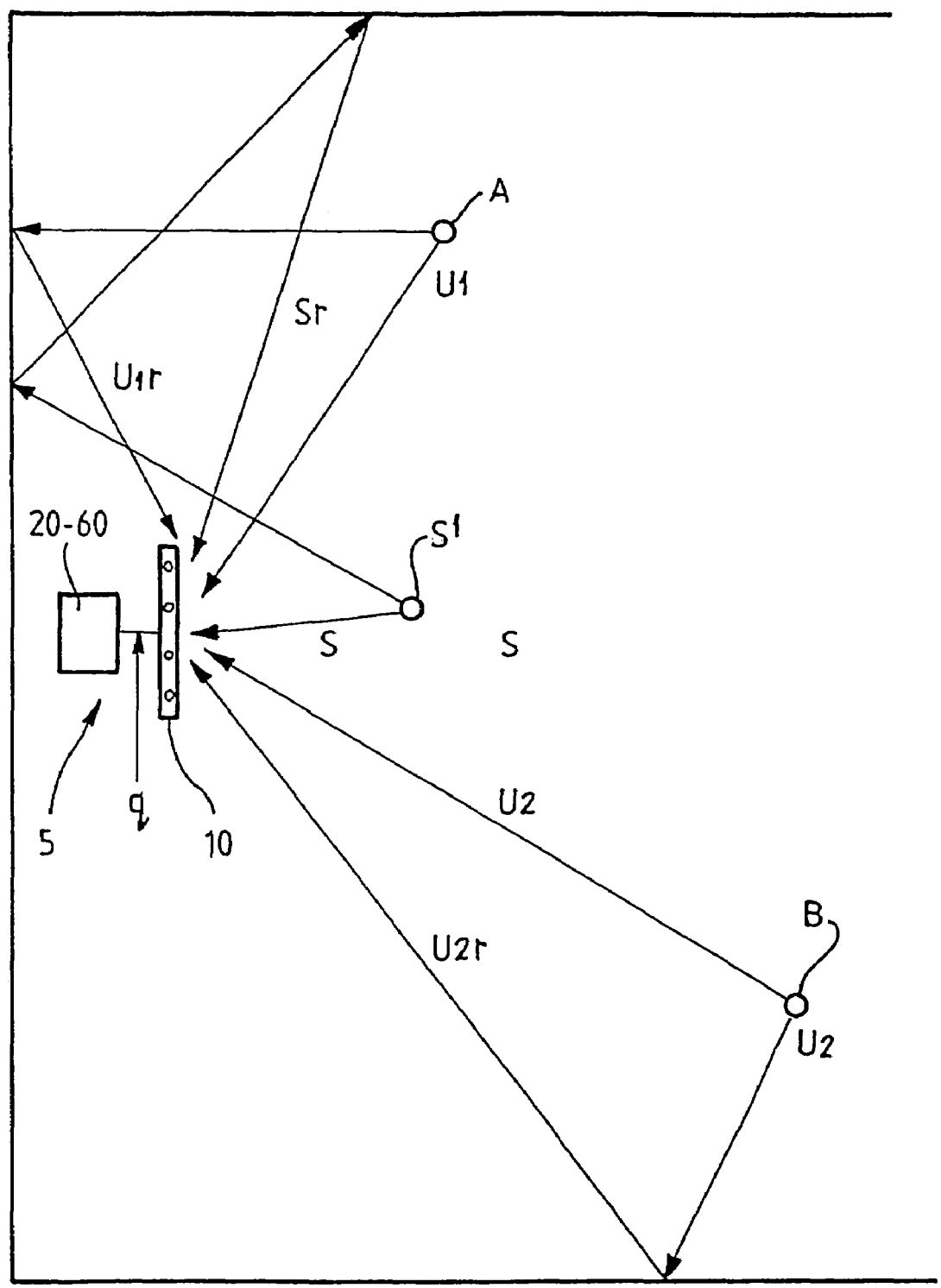
FIGURE _ 1 _

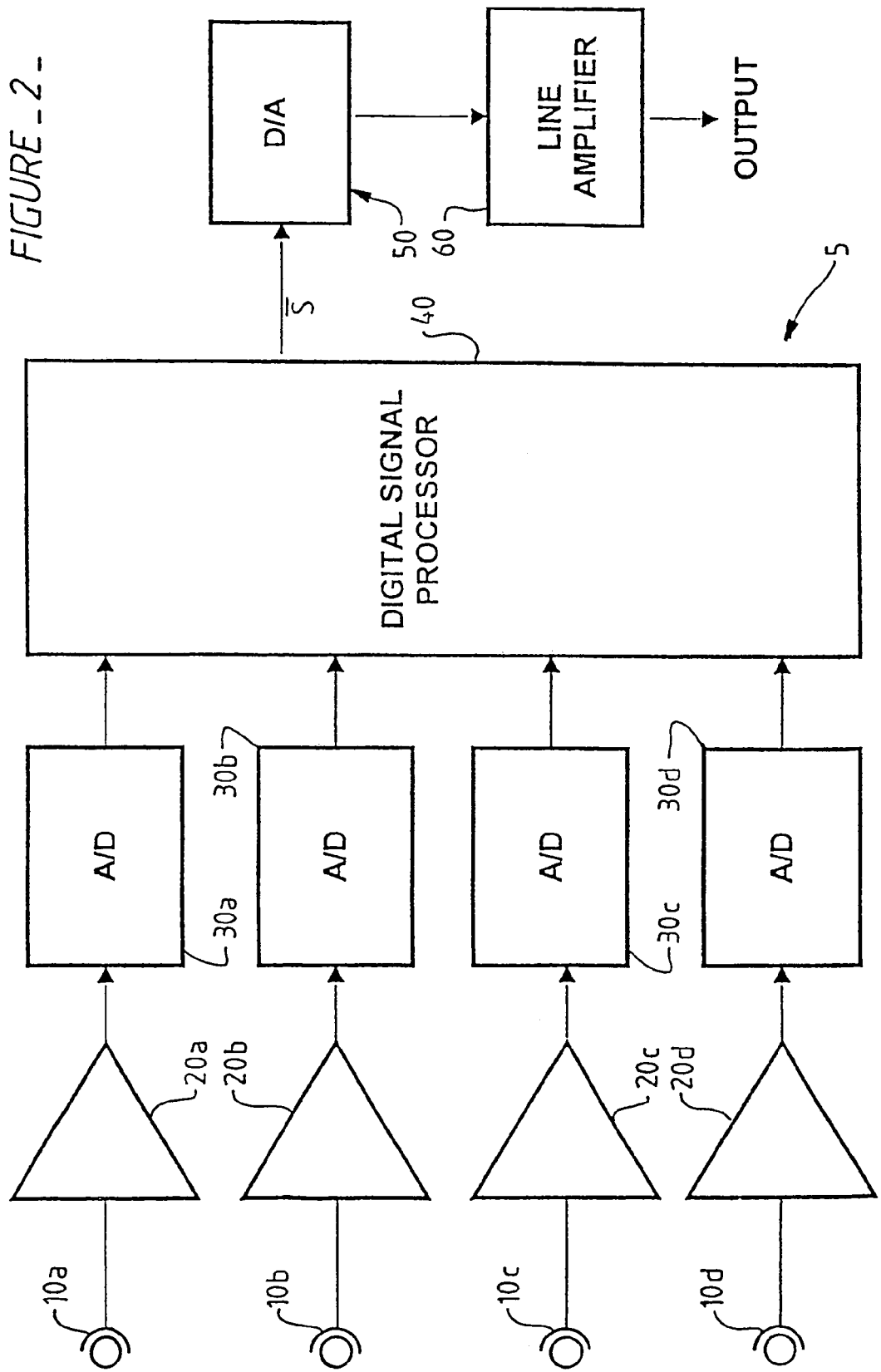
FIGURE_2_

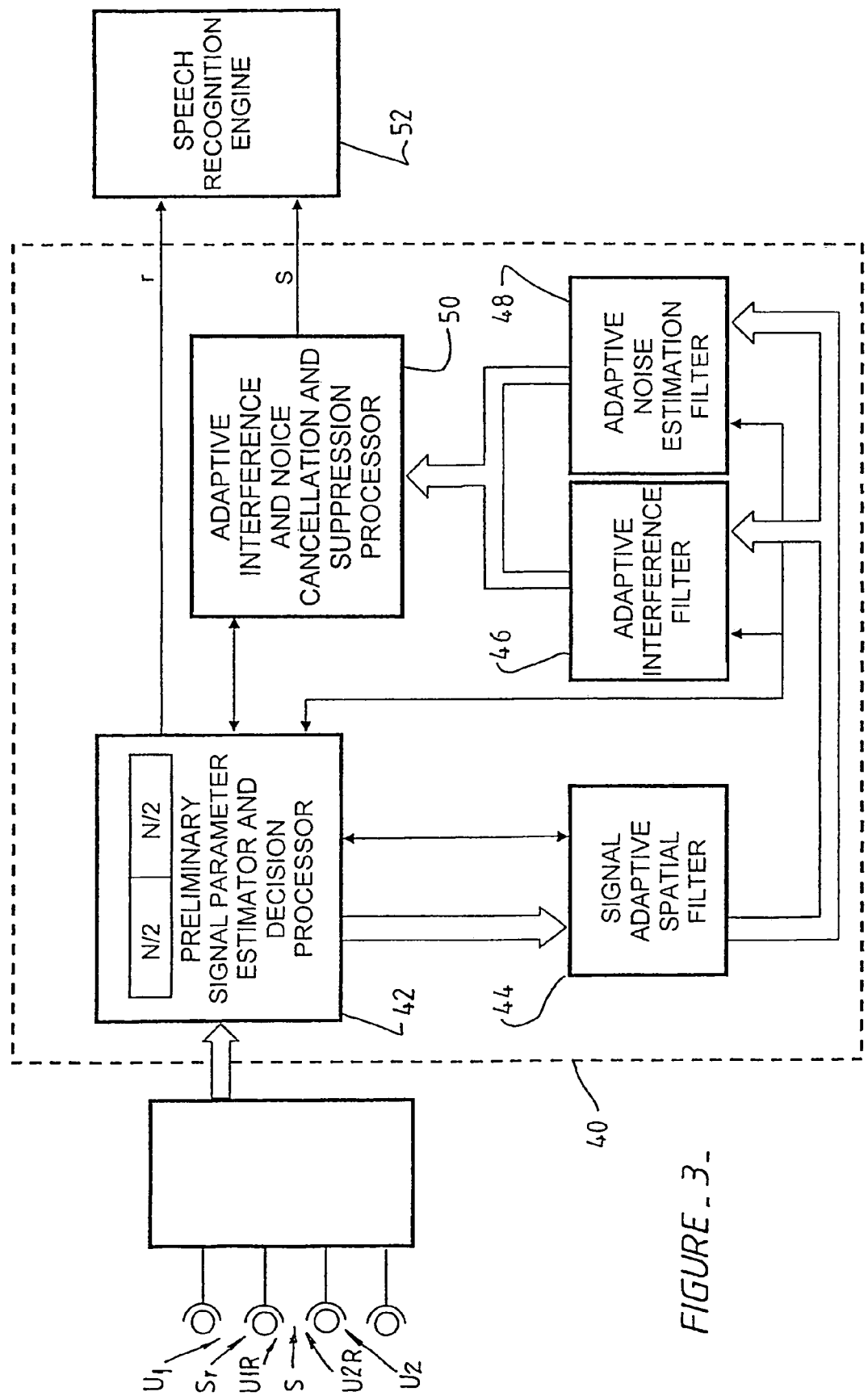
FIGURE_3_

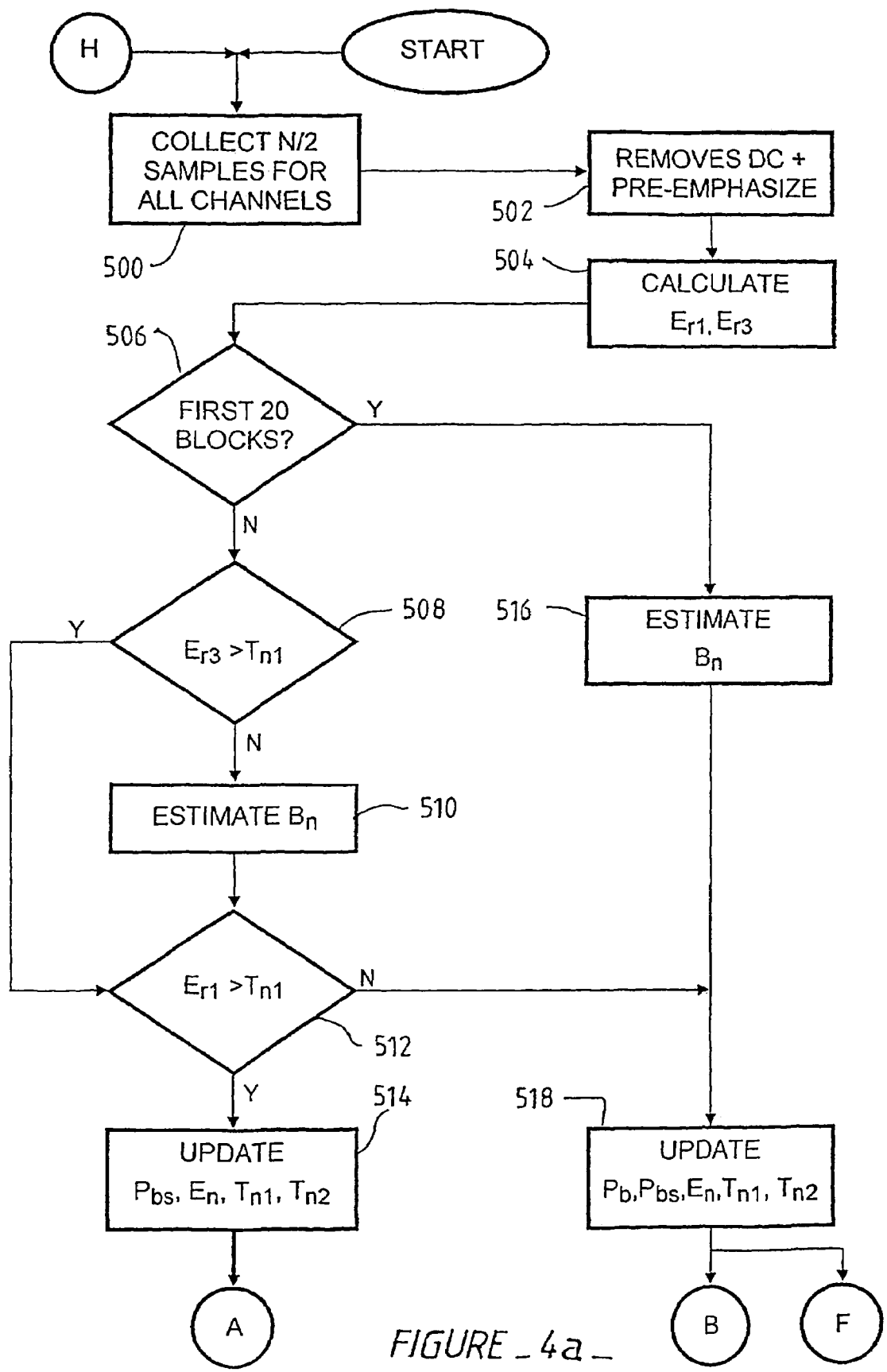
FIGURE_4a_

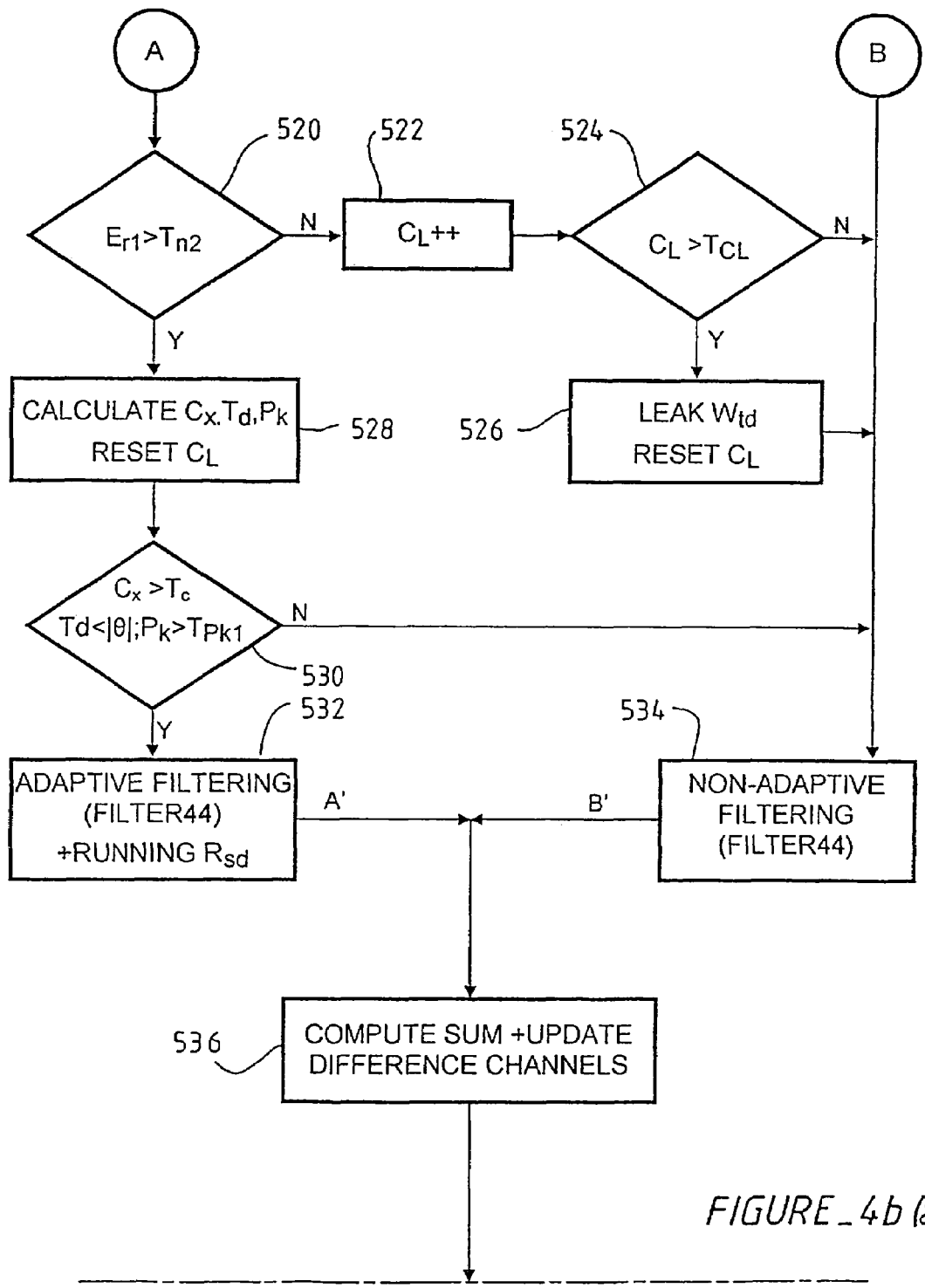
FIGURE_4b (a)_

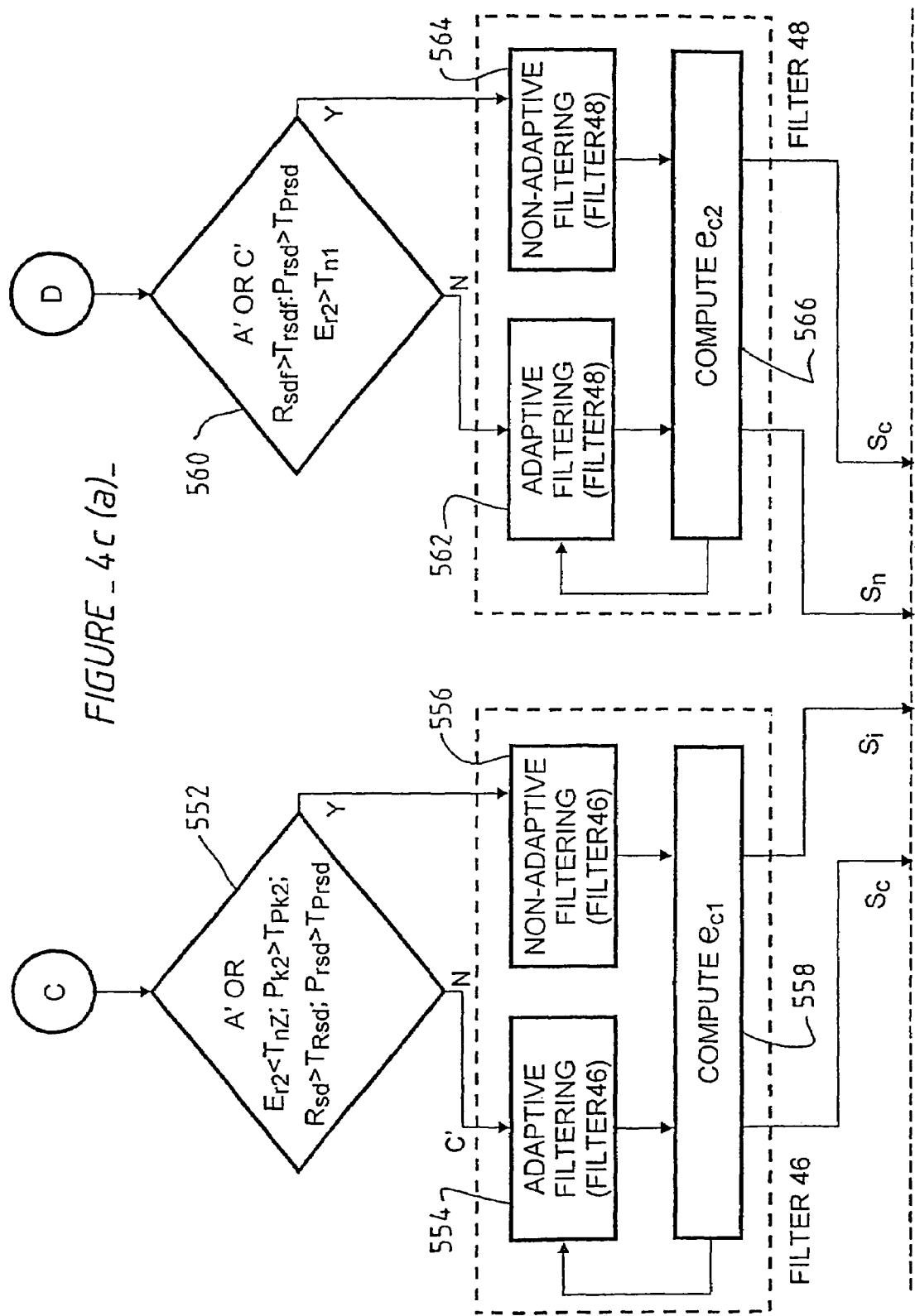
FIGURE_4c(a).

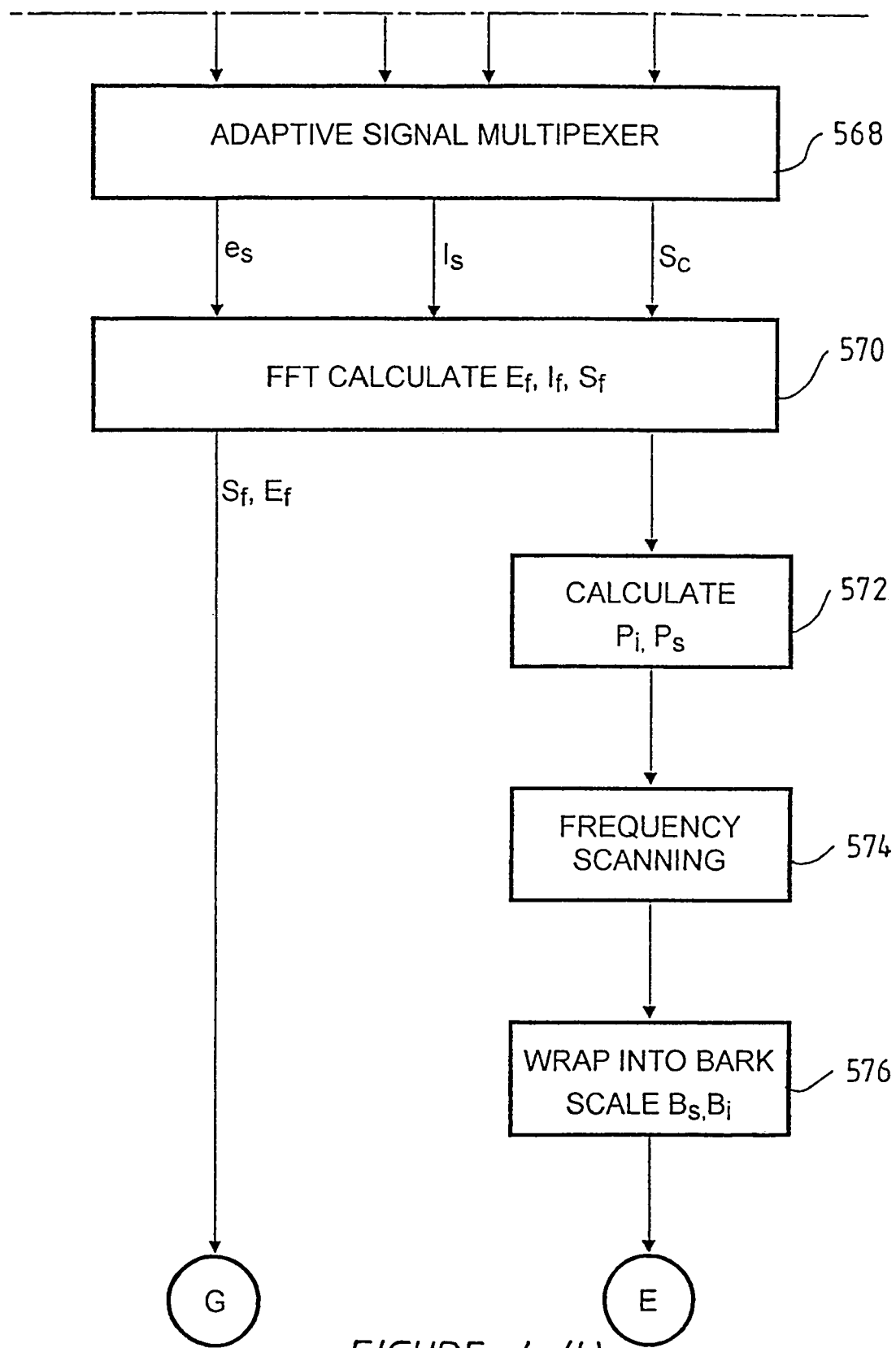
FIGURE_4c(b)_

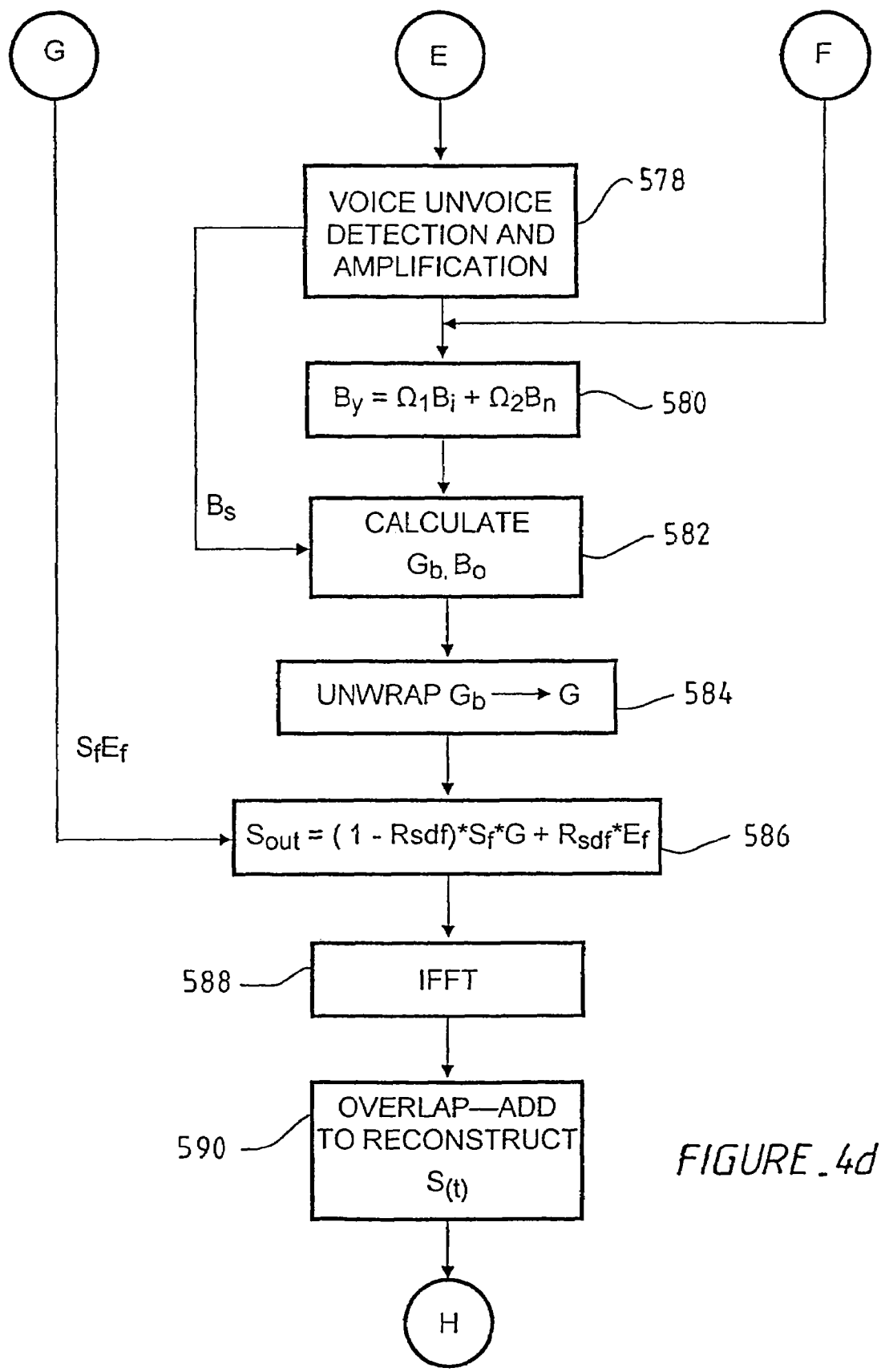
FIGURE_4d_

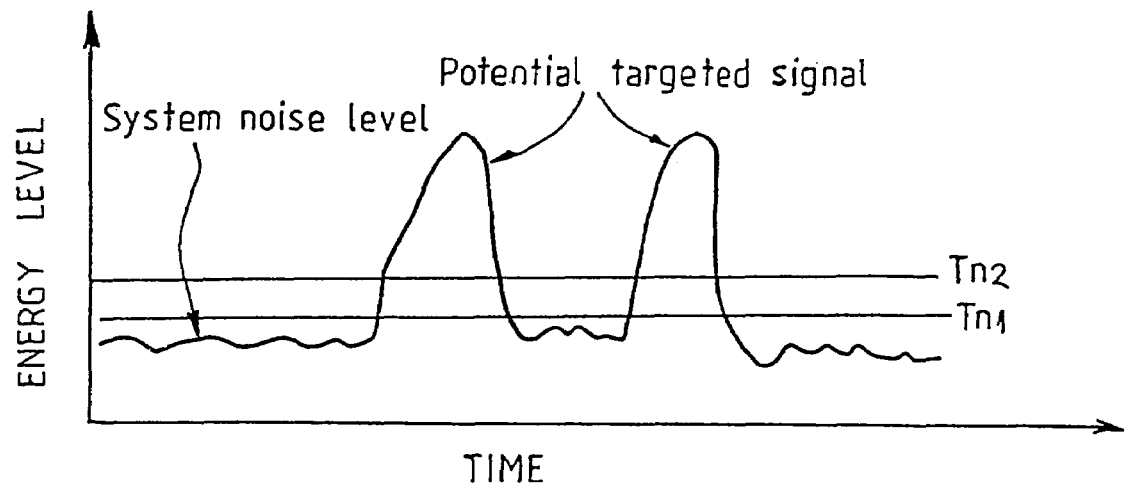
FIGURE_5_
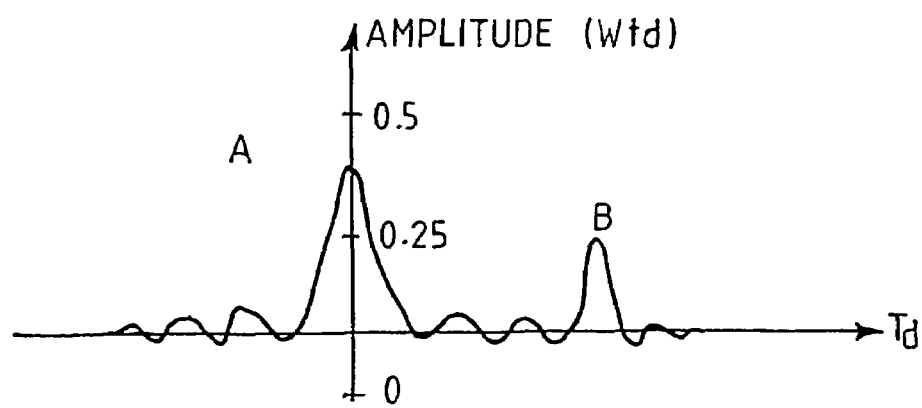
FIGURE_7_

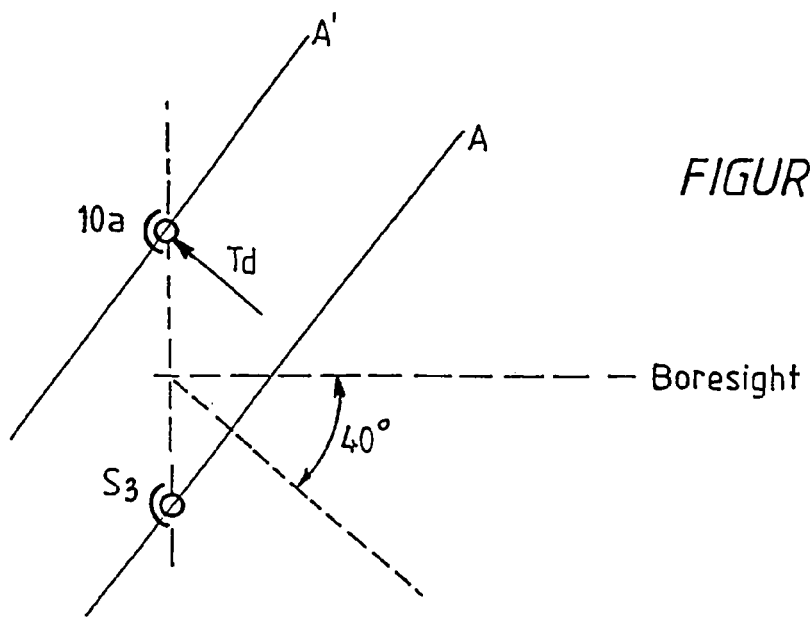
FIGURE _ 6A _
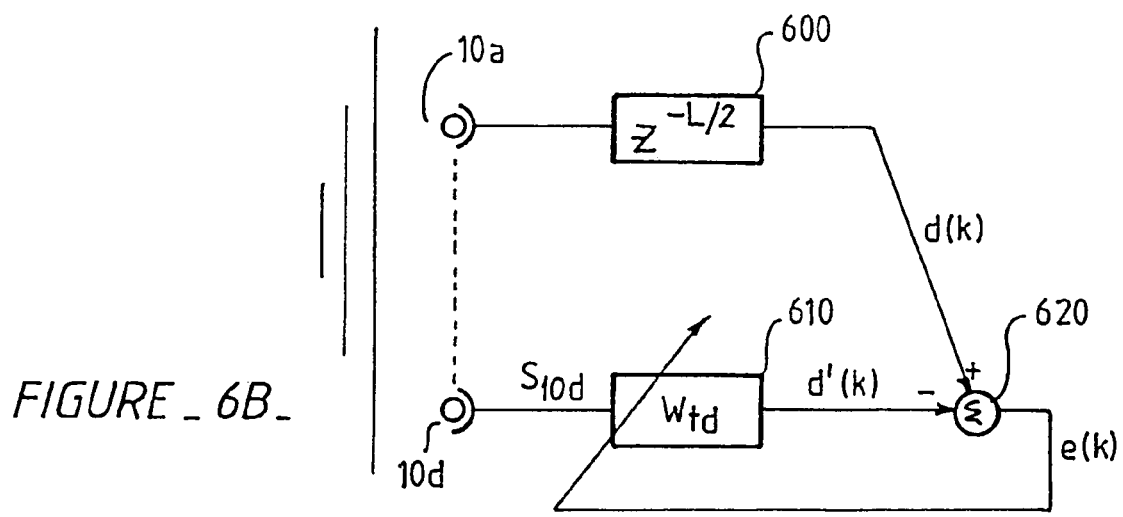
FIGURE _ 6B _
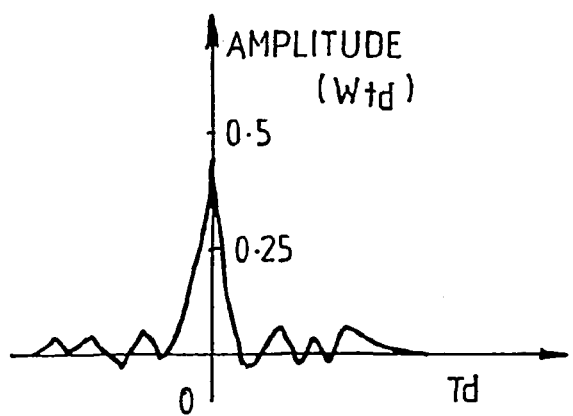
FIGURE _ 6C _

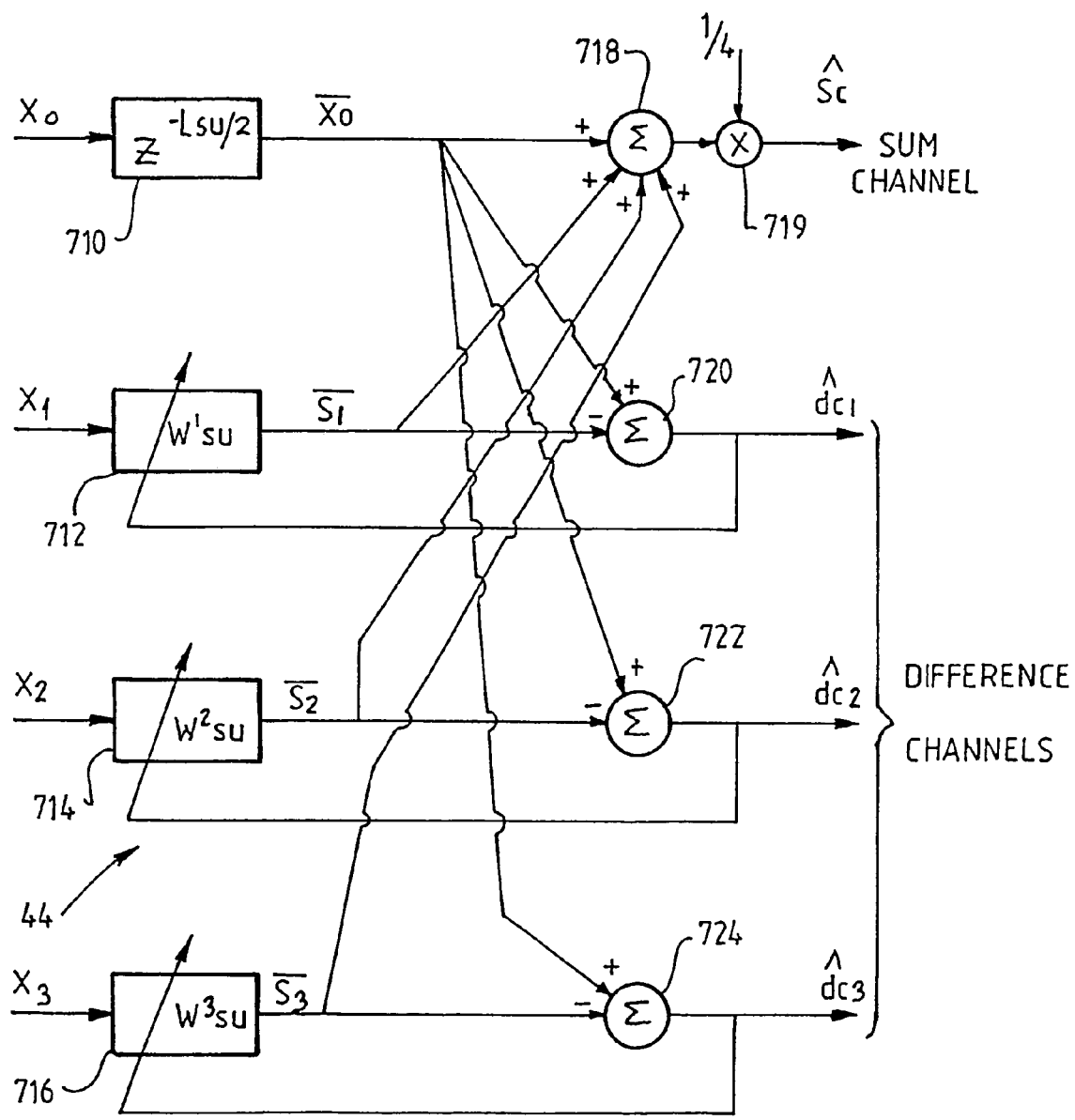
FIGURE_8_

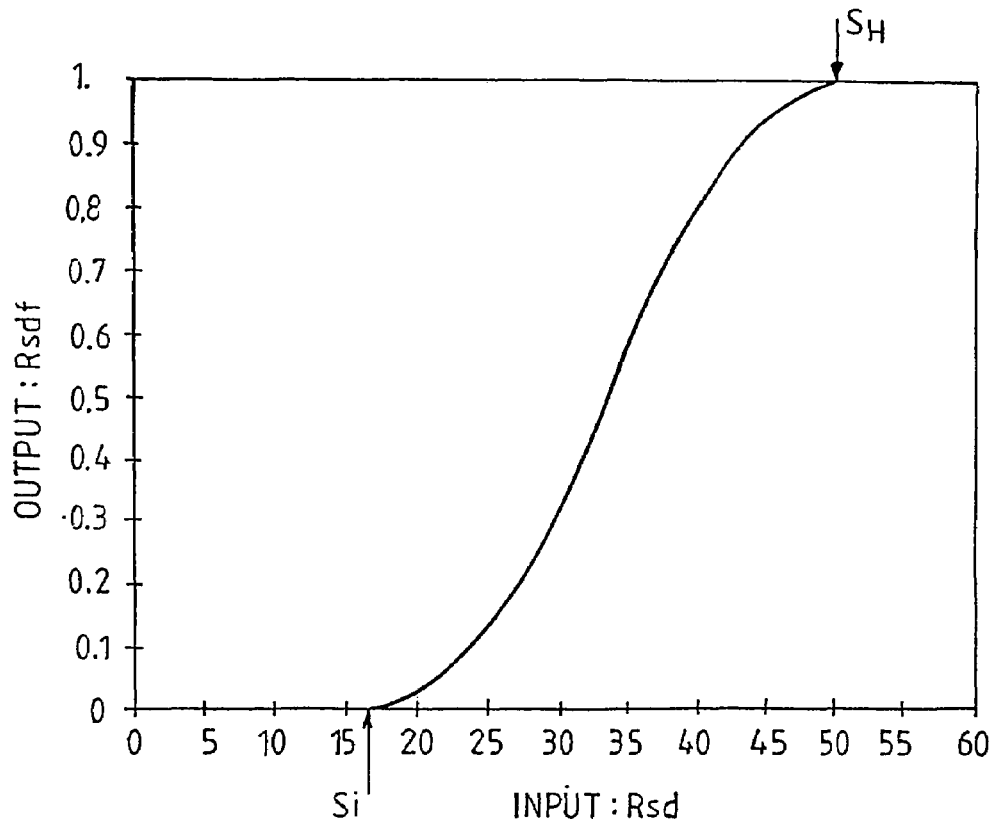
*FIGURE_9_*
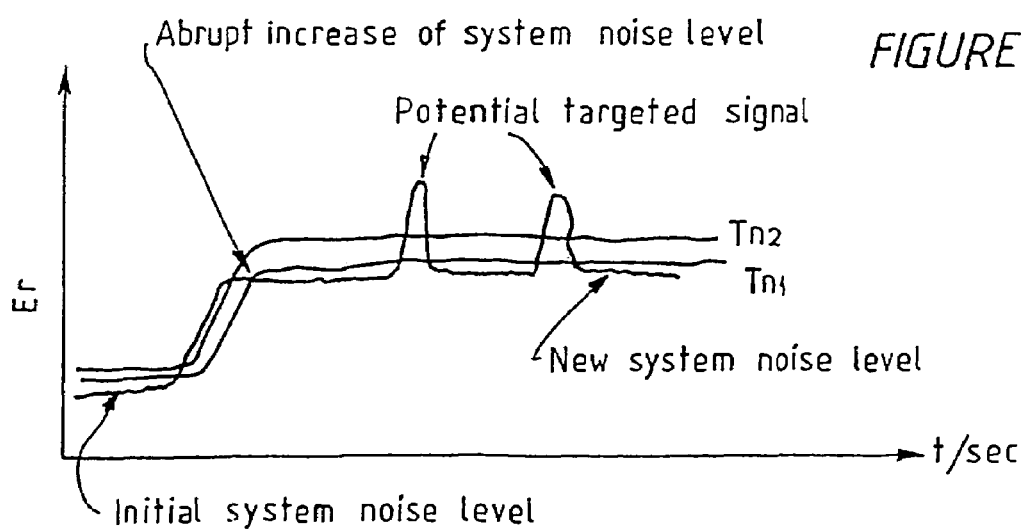
*FIGURE_15_*

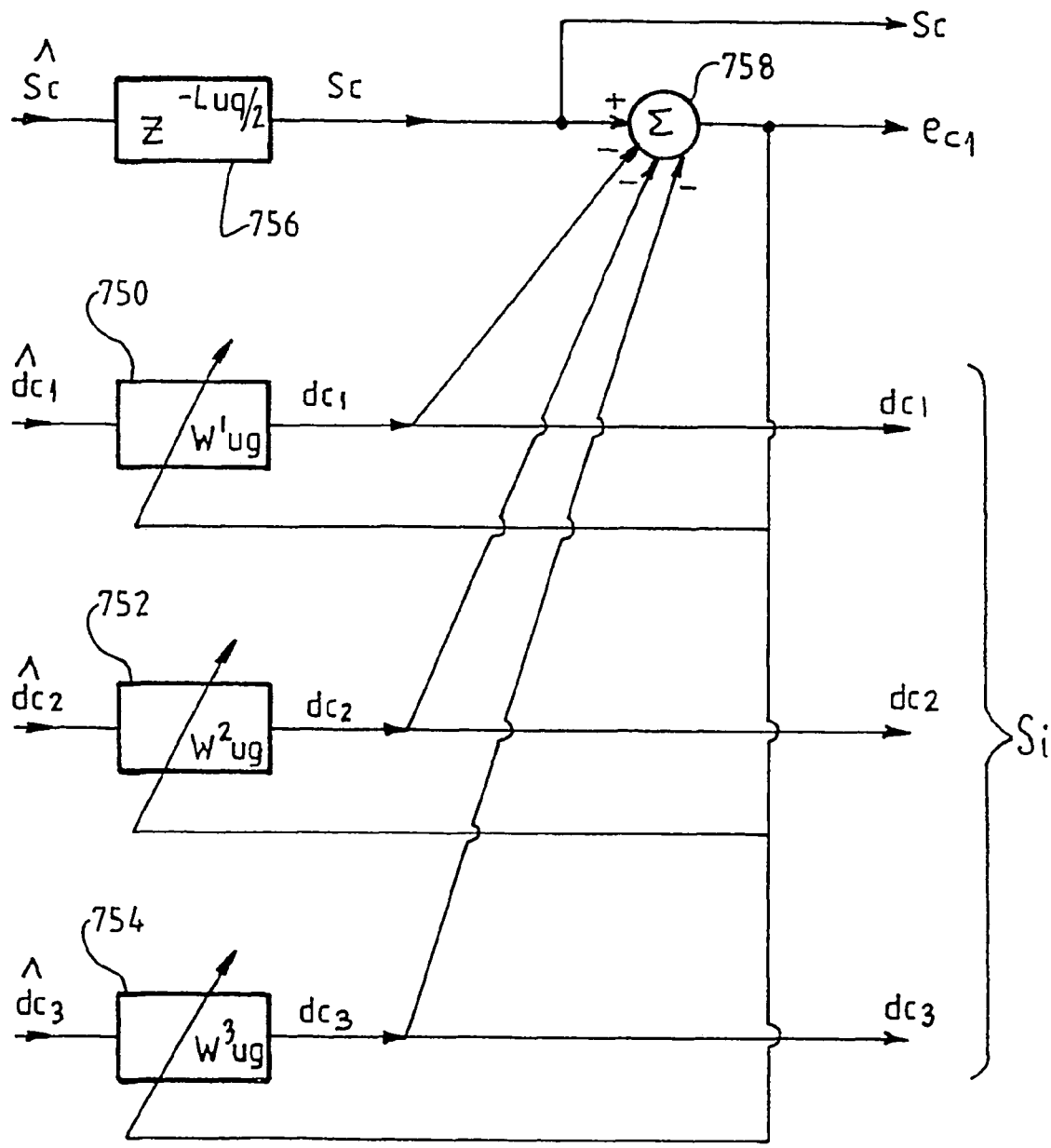
*FIGURE_10_*

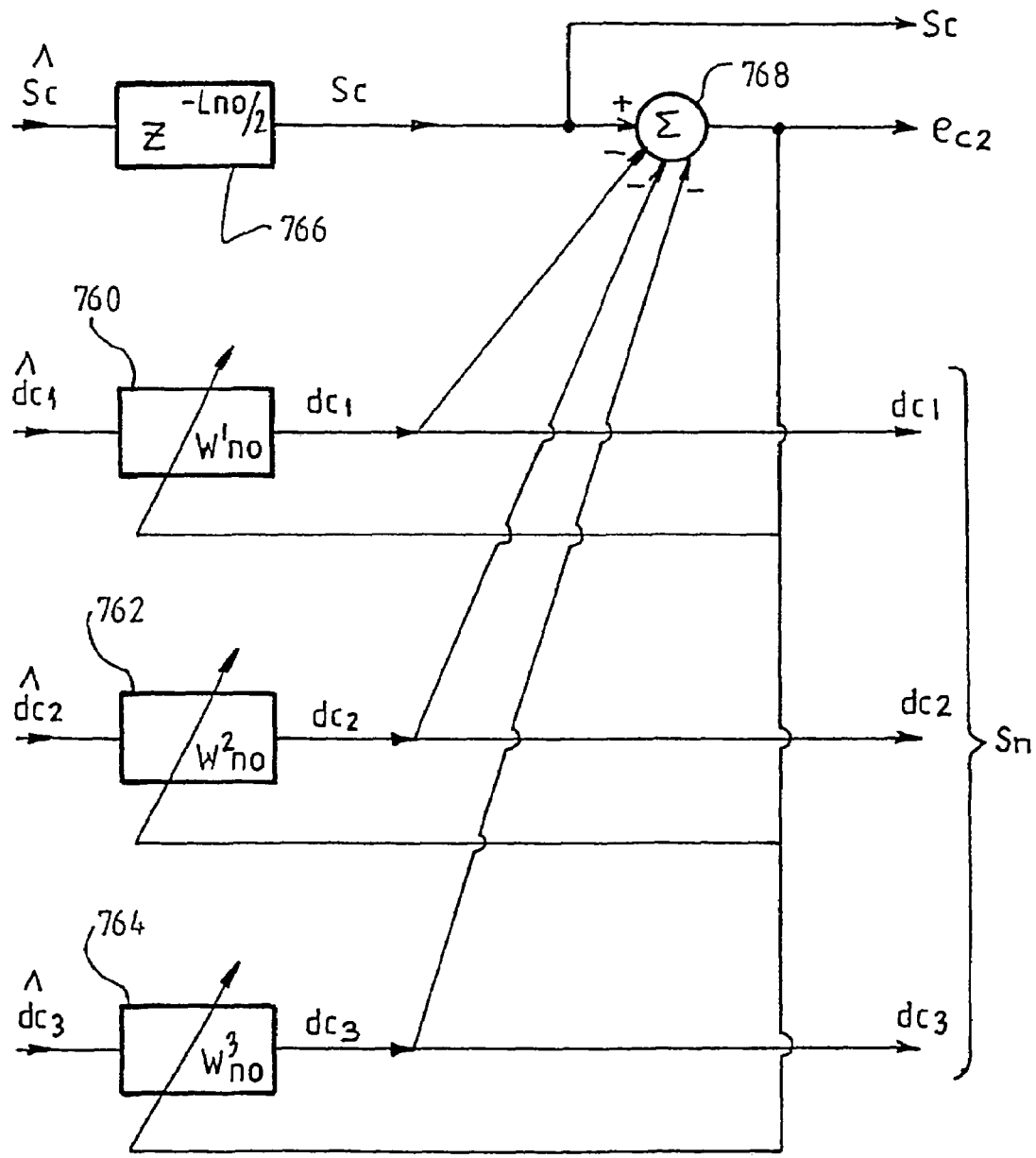
FIGURE_11

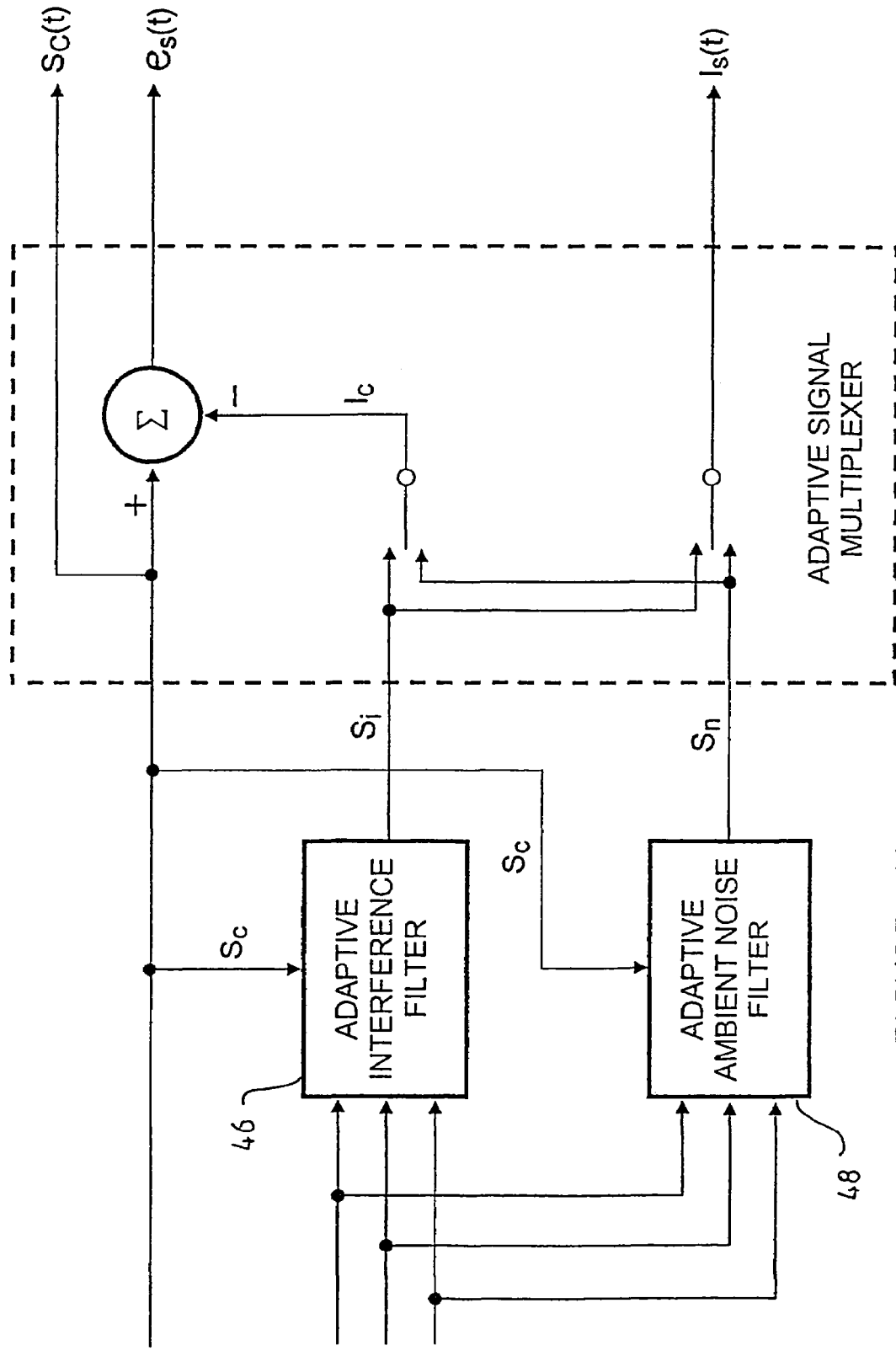
FIGURE -12-

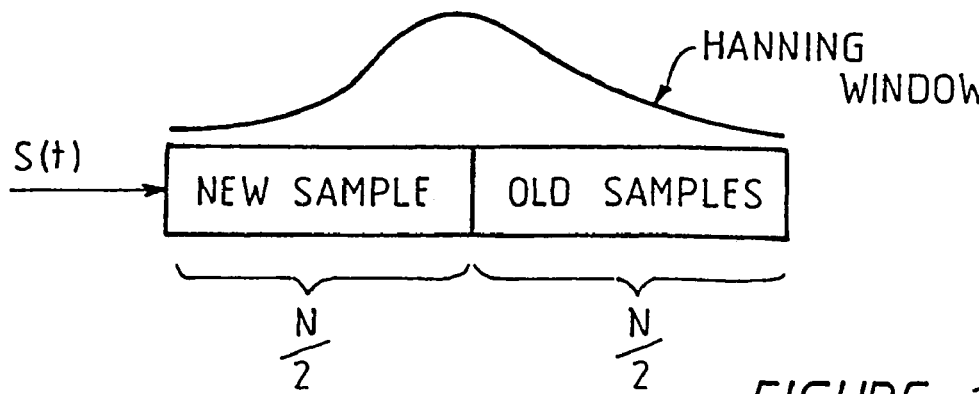
*FIGURE _13_*
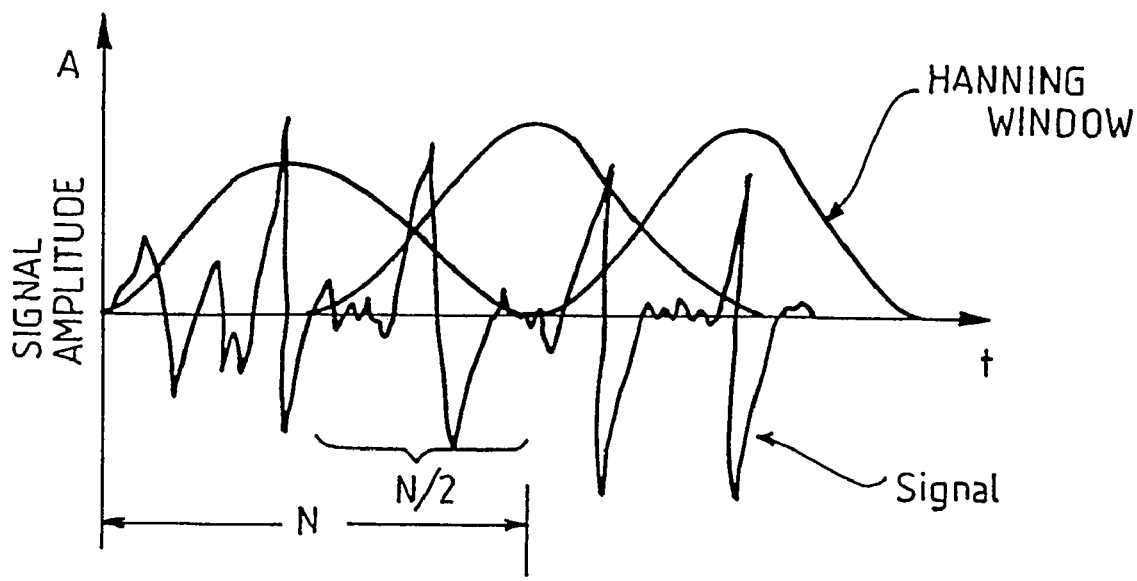
*FIGURE _14_*
Over-lap block processing of a signal using Hanning Window. The over-lap in this case is 50%.

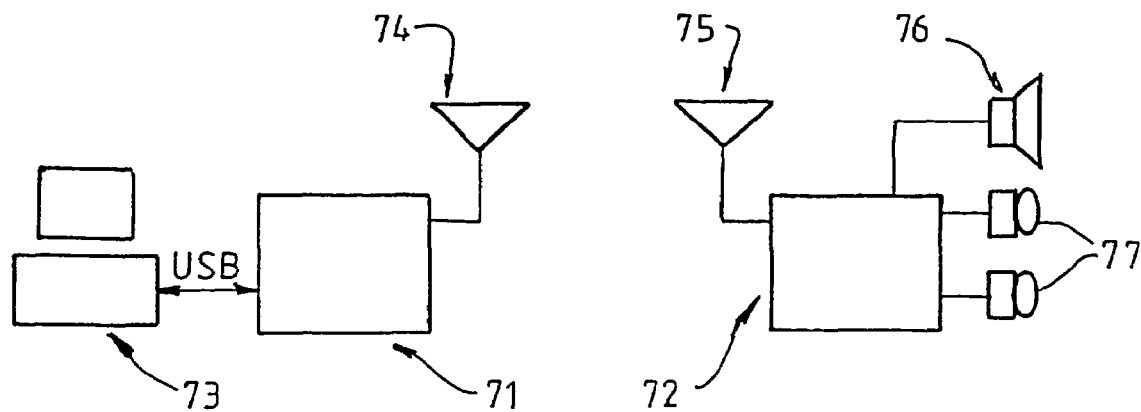
FIGURE_16_
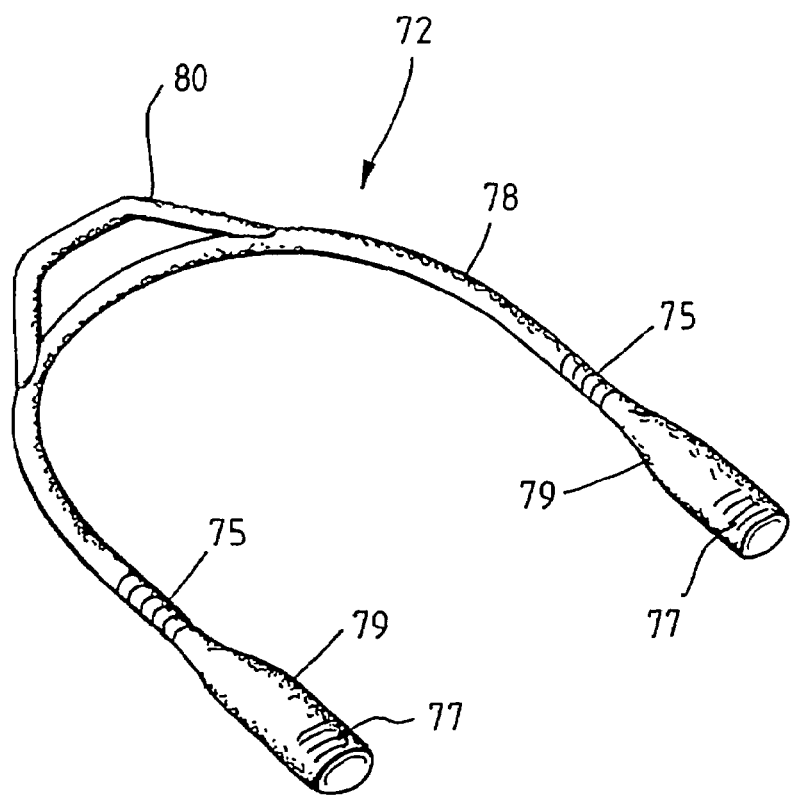
FIGURE_17_

FIGURE_18a_
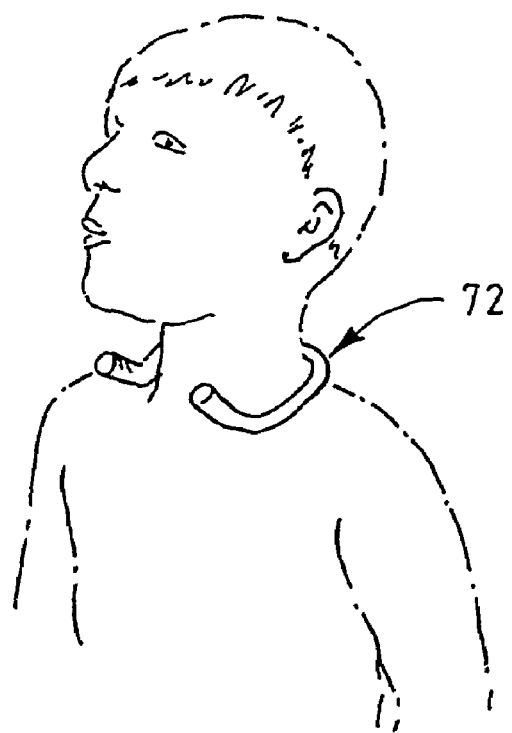
FIGURE_18b_

SYSTEM AND APPARATUS FOR SPEECH COMMUNICATION AND SPEECH RECOGNITION

FIELD OF THE INVENTION

The present invention relates to a system and apparatus for speech communication and speech recognition. It further relates to signal processing methods which can be implemented in the system.

BACKGROUND OF THE INVENTION

The present applicant's PCT application PCT/SG99/00119, the disclosure of which is incorporated herein by reference in its entirety, proposes a method of processing signals in which signals received from an array of sensors are subject to a first adaptive filter arranged to enhance a target signal, followed by a second adaptive filter arranged to suppress unwanted signals. The output of the second filter is converted into the frequency domain, and further digital processing is performed in that domain.

The present invention seeks to provide a headset system performing improved signal processing of audio signals and suitable for speech communication.

The present invention further seeks to provide signal processing methods and apparatus suitable for use in a speech communication and/or speech recognition system.

SUMMARY OF THE INVENTION

In general terms, a first aspect of the present invention proposes a headset system including a base unit and a headset unit to be worn by a user (e.g. resting on the user's head or around the user's shoulders) and having a plurality of microphones, the headset unit and base unit being in mutual wireless communication, and at least one of the base unit and the headset unit having digital signal processing means arranged to perform signal processing in the time domain on audio signals generated by the microphones, the signal processing means including at least one adaptive filter to enhance a wanted signal in the audio signals and at least one adaptive filter to reduce an unwanted signal in the audio signals.

Preferably the digital signal processing means are part of the headset unit.

The headset can be used for communication with the base unit, and optionally with other individuals, especially via the base unit. The headset system may comprise, or be in communication with, a speech recognition engine for recognizing speech of the user wearing the headset unit.

Although the signal processing may be as described in PCT/SG99/00119, more preferably, the signal processing is modified to distinguish between the noise and interference signals. Signals received from the microphones (array of sensors) are processed using a first adaptive filter to enhance a target signal, and then divided and supplied to a second adaptive filter arranged to reduce interference signals and a third filter arranged to reduce noise. The outputs of the second and third filters are combined, and may be subject to further processing in the frequency domain.

In fact, this concept provides a second, independent aspect of the invention which is a method of processing signals received from an array of sensors comprising the steps of sampling and digitising the received signals and processing the digitally converted signals, the processing including:

filtering the digital signals using a first adaptive filter arranged to enhance a target signal in the digital signals, transmitting the output of the first adaptive filter to a second adaptive filter and to a third adaptive filter, the second filter being arranged to suppress unwanted interference signals, and the third filter being arranged to suppress noise signals; and combining the outputs of the second and third filters.

The invention further provides signal processing apparatus for performing such a method.

BRIEF DESCRIPTION OF THE DRAWINGS

An embodiment of the invention will now be described by way of example with reference to the accompanying drawings in which:

FIG. 1 illustrates a general scenario in which an embodiment of the invention may operate.

FIG. 2 is a schematic illustration of a general digital signal processing system which is an embodiment of present invention.

FIG. 3 is a system level block diagram of the described embodiment of FIG. 2.

FIG. 4a-d is a flow chart illustrating the operation of the embodiment of FIG. 3.

FIG. 5 illustrates a typical plot of non-linear energy of a channel and the established thresholds.

FIG. 6(a) illustrates a wave front arriving from 40 degree off-boresight direction.

FIG. 6(b) represents a time delay estimator using an adaptive filter.

FIG. 6(c) shows the impulse response of the filter indicates a wave front from the boresight direction.

FIG. 7 shows the response of time delay estimator of the filter indicates an interference signal together with a wave front from the boresight direction.

FIG. 8 shows the schematic block diagram of the four channels Adaptive Spatial Filter.

FIG. 9 is a response curve of S-shape transfer function (S function).

FIG. 10 shows the schematic block diagram of the Adaptive Interference Filter.

FIG. 11 shows the schematic block diagram of the Adaptive Ambient Noise Estimator.

FIG. 12 is a block diagram of Adaptive Signal Multiplexer.

FIG. 13 shows an input signal buffer.

FIG. 14 shows the use of a Hanning Window on overlapping blocks of signals.

FIG. 15 illustrates a sudden rise of noise level of the nonlinear energy plot.

FIG. 16 illustrates a specific embodiment of the invention schematically.

FIG. 17 illustrates a headset unit which is a component of the embodiment of FIG. 16.

FIG. 18, which is composed of FIGS. 18(a) and 18(b), shows two ways of wearing the headset unit of FIG. 17.

DETAILED DESCRIPTION OF THE EMBODIMENT OF THE INVENTION

Figure 4B:
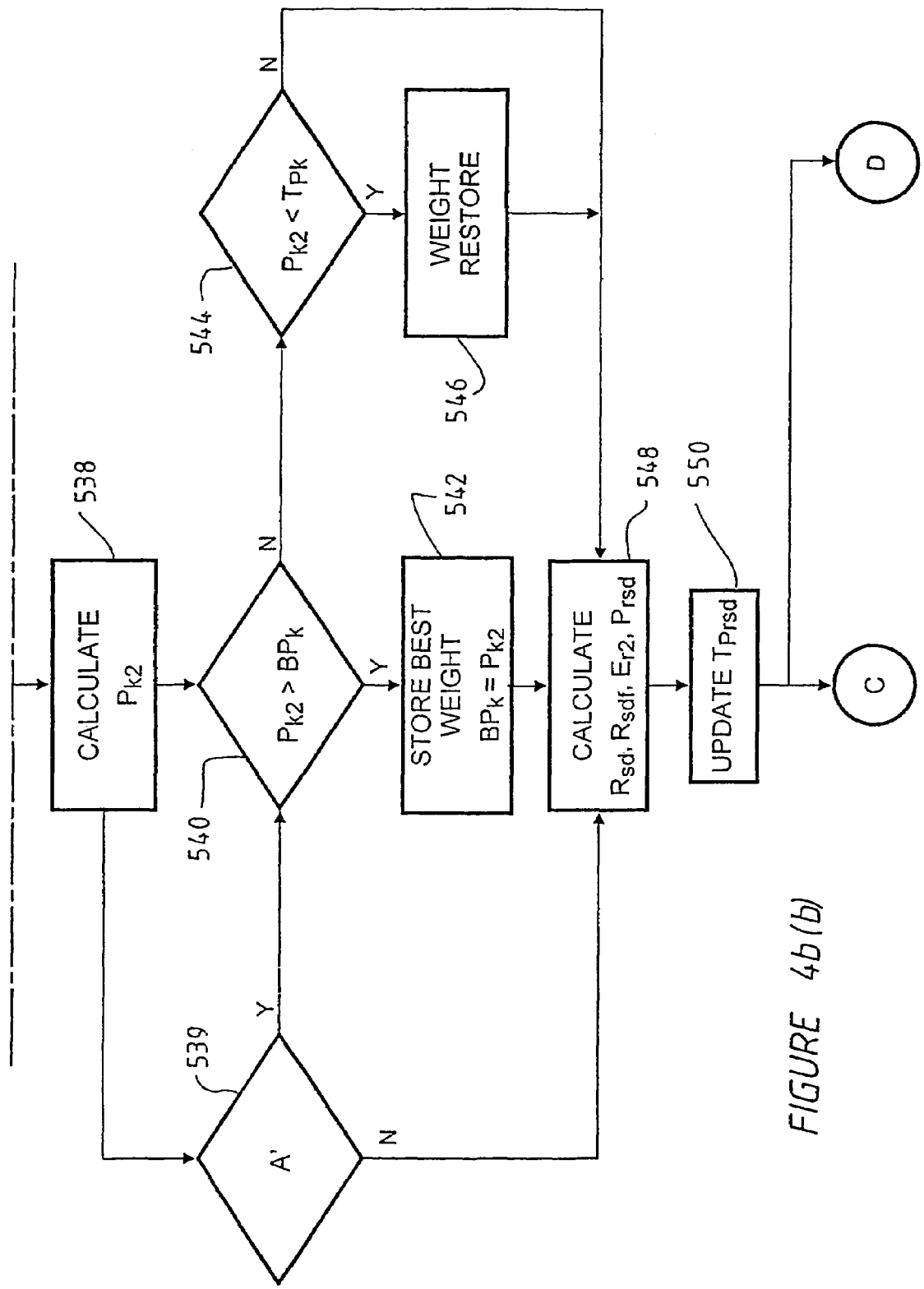

Below, with reference to FIGS. 16 and 17, we describe a specific embodiment of the invention. Before that, we describe in detail a digital signal processing technique which may be employed by the invention.

FIG. 1 illustrates schematically the operating environment of a signal processing apparatus 5 of the described embodiment of the invention, shown in a simplified example of a room. A target sound signal "s" emitted from a source s' in a known direction impinging on a sensor array, such as a microphone array 10 of the apparatus 5, is coupled with other unwanted signals namely interference signals u1, u2 from other sources A, B, reflections of these signals u1r, u2r and the target signal's own reflected signal sr. These unwanted signals cause interference and degrade the quality of the target signal "s" as received by the sensor array. The actual number of unwanted signals depends on the number of sources and room geometry but only three reflected (echo) paths and three direct paths are illustrated for simplicity of explanation. The sensor array 10 is connected to processing circuitry 20-60 and there will be a noise input q associated with the circuitry which further degrades the target signal.

An embodiment of signal processing apparatus 5 is shown in FIG. 2. The apparatus observes the environment with an array of four sensors such as microphones 10a-10d. Target and noise/interference sound signals are coupled when impinging on each of the sensors. The signal received by each of the sensors is amplified by an amplifier 20a-d and converted to a digital bitstream using an analogue to digital converter 30a-d. The bit streams are feed in parallel to the digital signal processor 40 to be processed digitally. The processor provides an output signal to a digital to analogue converter 50 which is fed to a line amplifier 60 to provide the final analogue output.

FIG. 3 shows the major functional blocks of the digital processor in more detail. The multiple input coupled signals are received by the four-channel microphone array 10a-10d, each of which forms a signal channel, with channel 10a being the reference channel. The received signals are passed to a receiver front end which provides the functions of amplifiers 20 and analogue to digital converters 30 in a single custom chip. The four channel digitized output signals are fed in parallel to the digital signal processor 40. The digital signal processor 40 comprises five sub-processors. They are (a) a Preliminary Signal Parameters Estimator and Decision Processor 42, (b) a Signal Adaptive Filter 44, (c) an Adaptive Interference Filter 46, (d) an Adaptive Noise Estimation Filter 48, and (e) an Adaptive Interference and Noise Cancellation and Suppression Processor 50. The basic signal flow is from processor 42, to processor 44, to processor 46 and 48, to processor 50. The output of processor 42 is referred to as "stage 1" in this process; the output of processor 44 as "stage 2", and the output of processors 46, 48 as "stage 3". These connections being represented by thick arrows in FIG. 3. The filtered signal S is output from processor 50. Decisions necessary for the operation of the processor 40 are generally made by processor 42 which receives information from processors 44-50, makes decisions on the basis of that information and sends instructions to processors 44-50, through connections represented by thin arrows in FIG. 3. The outputs I, S of the processor 40 are transmitted to a Speech recognition engine, 52.

It will be appreciated that the splitting of the processor 40 into the five component parts 42, 44, 46, 48 and 50 is essentially notional and is made to assist understanding of the operation of the processor. The processor 40 would in reality be embodied as a single multi-function digital processor performing the functions described under control of a program with suitable memory and other peripherals. Furthermore, the operation of the speech recognition engine 52 also could in principle be incorporated into the operation of the processor 40.

A flowchart illustrating the operation of the processors is shown in FIG. 4a-d and this will firstly be described generally. A more detailed explanation of aspects of the processor operation will then follow.

The front end 20,30 processes samples of the signals received from array 10 at a predetermined sampling frequency, for example 16 kHz. The processor 42 includes an input buffer 43 that can hold N such samples for each of the four channels. Upon initialization, the apparatus collects a block of N/2 new signal samples for all the channels at step 500, so that the buffer holds a block of N/2 new samples and a block of N/2 previous samples. The processor 42 then removes any DC from the new samples and pre-emphasizes or whitens the samples at step 502.

Following this, the total non-linear energy of a stage 1 signal sample $E_{r1}$ and a stage 2 signal sample $E_{r3}$ is calculated at step 504. The samples from the reference channel 10a are used for this purpose although any other channel could be used.

There then follows a short initialization period at step 506 in which the first 20 blocks of N/2 samples of signal after start-up are used to estimate a Bark Scale system noise $B_n$ at step 516 and a histogram Pb at step 518. During this short period, an assumption is made that no target signals are present. The updated Pb is then used with updated Pbs to estimate the environment noise energy $E_n$ and two detection thresholds, a noise threshold $T_{n1}$ and a larger signal threshold $T_{n2}$, are calculated by processor 42 from $E_n$ using scaling factors. The routine then moves to point B and point F.

After this initialization period, Pbs and $B_n$ are updated when an update condition is fulfilled.

At step 508, it is determined if the stage 3 signal energy $E_{r3}$ is greater than the noise threshold $T_{n1}$. If not, the Bark Scale system noise $B_n$ is updated at step 510. Then, it'll proceed to step 512. If so, the routine will skip step 510 and proceed to step 512. A test is made at step 512 to see if the signal energy $E_{r1}$ is greater than the noise threshold $T_{n1}$. If so, Pb and Pbs are estimated at step 518 for computing $E_n$, $T_{n1}$ and $T_{n2}$. The routine then moves to point B and point F. If not, only Pbs will be updated and it's used with previous Pb to compute $E_n$, $T_{n1}$ and $T_{n2}$ at step 514. $T_{n1}$ and $T_{n2}$ will follow the environment noise level closely. The histogram is used to determine if the signal energy level shows a steady state increase which would indicate an increase in noise, since the speech target signal will show considerable variation over time and thus can be distinguished. This is illustrated in FIG. 15 in which a signal noise level rises from an initial level to a new level which exceeds both thresholds.

A test is made at step 520 to see if the estimated energy $E_{r1}$ in the reference channel 10a exceeds the second threshold $T_{n2}$. If so, a counter $C_L$ is reset and a candidate target signal is deemed to be present. The apparatus only wishes to process candidate target signals that impinge on the array 10 from a known direction normal to the array, hereinafter referred to as the boresight direction, or from a limited angular departure there from, in this embodiment plus or minus 15 degrees. Therefore, the next stage is to check for any signal arriving from this direction.

At step 528, three coefficients are established, namely a correlation coefficient $C_x$, a correlation time delay $T_d$ and a filter coefficient peak ratio $P_k$ which together provide an indication of the direction from which the target signal arrived.

At step 530, three tests are conducted to determine if the candidate target signal is an actual target signal. First, the cross correlation coefficient $C_x$ must exceed a predetermined threshold $T_c$, second, the size of the delay coefficient must be less than a value θ indicating that the signal has impinged on the array within the predetermined angular range and lastly the filter coefficient peak ratio $P_k$ must exceed a predetermined threshold $T_{Pk1}$. If these conditions are not met, the signal is not regarded as a target signal and the routine passes to step 534 (non-target signal filtering). If the conditions are met, the confirmed target signal is fed to step 532 (target signal filtering) of Signal Adaptive Spatial Filter 44.

If at step 520, the estimated energy $E_{r1}$ in the reference channel 10a is found not to exceed the second threshold $T_{n2}$, the target signal is considered not to be present and the routine passes to step 534 via steps 522-526 in which the counter $C_L$ is incremented. At step 524, $C_L$ is checked against a threshold $T_{CL}$. If the threshold is reached, block leak compensation is performed on the filter coefficient $W_{td}$ and counter $C_L$ is reset at step 526. This block leak compensation step improves the adaptation speed of the filter coefficient $W_{td}$ to the direction of fast changing target sources and environment. If the threshold is not reached, the program moves to step 534 described below.

Following step 530, the confirmed target signal is fed to step 532 at the Signal Adaptive Spatial Filter 44. The filter is instructed to perform adaptive filtering at step 532 and 536, in which the filter coefficients $W_{su}$ are adapted to provide a "target signal plus noise" signal in the reference channel and "noise only" signals in the remaining channels using the Least Mean Square (LMS) algorithm. In order to prevent the filter coefficient updated wrongly, a running energy ratio $R_{sd}$ is computed at every sample at step 532. This running energy ratio $R_{sd}$ is used as a condition to test whether that the filter coefficient corresponding to that particular sample should be updated or not. The filter 44 output channel equivalent to the reference channel is for convenience referred to as the Sum Channel and the filter 44 output from the other channels, Difference Channels. The signal so processed will be, for convenience, referred to as A'.

If the signal is considered to be a noise signal, the routine passes to step 534 in which the signals are passed through filter 44 without the filter coefficients being adapted, to form the Sum and Difference channel signals. The signals so processed will be referred to for convenience as B'.

The effect of the filter 44 is to enhance the signal if this is identified as a target signal but not otherwise.

At step 538, a new filter coefficient peak ratio $P_{k2}$ is calculated based on the filter coefficient $W_{su}$. At step 539, if the signal is not A' signals from step 532 the routine passes to step 548. Else, the peak ratio calculated at step 538 is compared with a best peak ratio $BP_k$ at step 540. If it is larger than best peak ratio, the value of best peak ratio is replaced by this new peak ratio $P_{k2}$ and all the filter coefficients $W_{su}$ are stored as the best filter coefficients at step 542. If it is not, the peak ratio $P_{k2}$ is again compared with a threshold $T_{Pk}$ at step 544. If the peak ratio is below the threshold, a wrong update on the filter coefficients is deemed to be occurred and the filter coefficients are restored to the previous stored best filter coefficients at step 546. If it is above the threshold, the routine passes to step 548.

At step 548, an energy ratio $R_{sd}$ and power ratio $P_{rsd}$ between the Sum Channel and the Difference Channels are estimated by processor 42. Besides these, two other coefficients are also established, namely an energy ratio factor $R_{sdf}$ and a second stage non-linear signal energy $E_{r2}$. Following this, the adaptive noise power threshold $T_{Prsd}$ is updated based on the calculated power ratio $P_{rsd}$.

At this point, the signal is divided into two parallel paths namely point C and point D. Following point C, the signal is subject to a further test at step 552 to determine if the noise or interference presence. First, if the signals are A' signals from step 532, the routine passes to step 556. Second, if the estimated energy $E_{r2}$ is found not to exceed the second threshold $T_{n2}$, the signal is considered not to be present and the routine passes to step 556. Third, the filter coefficient peak ratio $P_{k2}$ is compared to a threshold $T_{Pk2}$. If it is higher than threshold, this may indicate that there is a target signal and routine passes to step 556. Lastly, the $R_{sd}$ and $P_{rsd}$ are compared to threshold $T_{rsd}$ and $T_{Prsd}$ respectively. If the ratios are both lower than threshold, this indicates probable noise but if higher, this may indicate that there has been some leakage of the target signal into the Difference channel, indication the presence of a target signal after all. For such target signals, the routine also passes to step 556. For all other non-target signals, the routine passes to step 554.

At step 554-558, the signals are processed by the Adaptive Interference Filter 46, the purpose of which is to reduce the unwanted signals. The filter 46, at step 554 is instructed to perform adaptive filtering on the non-target signals with the intention of adapting the filter coefficients to reducing the unwanted signal in the Sum channel to some small error value $e_{c1}$. This computed $e_{c1}$ is also fed back to step 554 to prevent signal cancellation cause by wrong updating of filter coefficients.

In the alternative, at step 556, the target signals are fed to the filter 46 but this time, no adaptive filtering takes place, so the Sum and Difference signals pass through the filter.

The output signals from processor 46 are thus the Sum channel signal $S_{c1}$ and filtered Difference signal $S_i$.

Following point D, the signals will pass through few test conditions at step 560. First, if the signals are A' signals from step 532, the routine passes to step 564. Second, if the signals are classified as non-target signal by step 552 (C' signal), the routine passes to step 564. Third, the $R_{sdf}$ and $P_{rsd}$ are compared to threshold $T_{rsdf}$ and $T_{Prsd}$ respectively. If the ratios are both lower than threshold, this indicates probable ambient noise signal but if higher, this may indicate that there has been some leakage of the target signal into the Difference channel, indication the presence of a target signal after all. Lastly, if the estimated energy $E_{r2}$ is found exceeds the first threshold $T_{n1}$, signals are considered to be present. For such signals, the routine also passes to step 564. For all other ambient noise signals, the routine passes to step 562.

At step 562-566, the signals are processed by the Adaptive Ambient noise Estimation Filter 48, the purpose of which is to reduce the unwanted ambient noise. The filter 48, at step 562 is instructed to perform adaptive filtering on the ambient noise signals with the intention of adapting the filter coefficients to reducing the unwanted ambient noise in the Sum channel to some small error value $e_{c2}$.

In the alternative, at step 564, the signals are fed to the filter 48 but this time, no adaptive filtering takes place, so the Sum and Difference signals pass through the filter.

The output signals from processor 48 are thus the Sum channel signal $S_{c2}$ and filtered Difference signal $S_n$.

At step 568, output signals from processor 46: $S_{c1}$ and $S_i$ and output signals from processor 48: $S_{c2}$ and $S_n$ are processed by an adaptive signal multiplexer. Here, those signals are multiplex and a weighted average error signal $e_s(t)$, a sum signal $S_c(t)$ and a weighted average interference signal $I_s(t)$ are produced. These signals are then collected for the new N/2 samples and the last N/2 samples from the previous block and a Hanning Window $H_n$ is applied to the collected samples as shown in FIG. 13 to form vectors $S_h$, $I_h$ and $E_h$. This is an overlapping technique with overlapping vectors $S_h$, $I_h$ and $E_h$ being formed from past and present blocks of N/2 samples continuously. This is illustrated in FIG. 14. A Fast Fourier Transform is then performed on the vectors $S_h$, $I_h$ and $E_h$ to transform the vectors into frequency domain equivalents $S_f$, $I_f$ and $E_f$ at step 570.

At step 572, a modified spectrum is calculated for the transformed signals to provide "pseudo" spectrum values $P_s$ and $P_i$.

In order to reduce signal distortion due to wrong estimation of the noise spectra, a frequency scanning is performed between $P_s$ and $P_i$ to look for the peaks in the same frequency components at step 574. Attenuation is then performed on those peaks in $P_i$ to reduce the signal cancellation effect. $P_s$ and $P_i$ are then warped into the same Bark Frequency Scale to provide Bark Frequency scaled values $B_s$ and $B_i$ at step 576. At step 578, a voice unvoice detection is performed on $B_s$ and $B_i$ to reduce the signal cancellation on the unvoice signal.

A weighted combination $B_y$ of $B_n$ (through path F) and $B_i$ is then made at step 580 and this is combined with $B_s$ to compute the Bark Scale non-linear gain $G_b$ at step 582.

$G_b$ is then unwrapped to the normal frequency domain to provide a gain value G at step 584 and this is then used at step 586 to compute an output spectrum $S_{out}$ using the signal spectrum $S_f$ and $E_f$ from step 570. This gain-adjusted spectrum suppresses the interference signals, the ambient noise and system noise.

An inverse FFT is then performed on the spectrum Sout at step 588 and the output signal is then reconstructed from the overlapping signals using the overlap add procedure at step 590.

Hence, besides providing the Speech Recognition Engine 52 with a processed signal S, the system also provides a set of useful information indicated as I on FIG. 3. This set of information may include any one or more of:

1. The direction of speech signal, $T_d$ (step 528).
2. Signal Energy, $E_{r1}$ (step 504).
3. Noise threshold, $T_{n1}$ & $T_{n2}$ (step 514 and 518).
4. Estimated SINR (signal to interference noise ratio) and SNR (signal to noise ratio), and $R_{sd}$ (step 548).
5. Target speech signal presence, A' (steps 530 and 532)
6. Spectrum of processed speech signal, $S_{out}$ (step 586).
7. Potential speech start and end point.
8. Interference signal spectrum, $I_f$ (step 570).

Major steps in the above described flowchart will now be described in more detail.

Non-Linear Energy Estimation (STEPS 504.548)

At each stage of adaptive filter, the reference signal is taken at a delay half the tap-size. Thus, the end of two stages adaptive filter, the signal is delayed by Lsu/2 and Luq/2. In order for the decision-making mechanism for the different stages to accurately follow these delays, the signal energy calculations are calculated at 3 junctions, resulting in 3 pairs of the signal energy.

The first signal energy is calculated at no delay and is used by the time delay estimation and stage1 Adaptive Spatial Filter.

$$E_{r1} = \frac{1}{J-2} \sum_{i=1}^{J-2} x(i)^2 - x(i+1)x(i-1) \qquad A.1$$

The second signal energy is calculated at a delay of half of Adaptive Spatial Filter tap-size, Lsu/2.

$$E_{r2} = \frac{1}{J-2} \sum_{i=-Lsu/2}^{J-Lsu/2-2} x(i)^2 - x(i+1)x(i-1) \qquad A.2$$

The last signal energy is calculated at a delay of Lsu/2+Luq/2 and is used by noise updating.

$$E_{r3} = \frac{1}{J-2} \sum_{i=-(Lsu/2+Luq/2)}^{J-(Lsu/2+Luq/2)-2} x(i)^2 - x(i+1)x(i-1) \qquad A.3$$

These delays are implemented by means of buffering.

Threshold Estimation and Updating (STEPS 514.518)

The processor 42 estimates two thresholds $T_{n1}$ and $T_{n2}$ based on a statistical approach. Two sets of histogram, referred to as Pb and Pbs, are computed in the same way, except that Pbs is computed every block of N/2 samples and Pb is computed only on the first 20 blocks of N/2 samples or when $E_{r1} < T_{n1}$ which means that there is neither a target signal nor an interference signal is present. $E_{r1}$ is used as the input sample of the histograms, and the length of the histograms is a number M (which may for example be 24). Each histogram is as found from the following equation:

$$H_i = \alpha H_i + (1-\alpha)\delta(i-D) \cdot I_{24 \times 1} \qquad B.1$$

Where $H_i$ stands for either of Pb and Pb, and has the form:

$$H_i = \begin{bmatrix} h(1) \\ h(2) \\ \vdots \\ h(i) \\ \vdots \\ h(24) \end{bmatrix} \qquad B.2$$

$$I_{24 \times 1} = \begin{bmatrix} 1 \\ 1 \\ \vdots \\ 1 \end{bmatrix} \qquad B.3$$

$$\delta(i-D) = \begin{matrix} 0, i \ne D \\ 1, i = D \end{matrix} \qquad B.4$$

Thus, α is a forgetting factor. For Pb, α is chosen empirically to be 0.9988 and for Pbs, α is equal to 0.9688.

The value of D which is used in Equation B1 is determined using table 1 below: Specifically, we find the value of Emax in table 1 which is lowest but which is above the input sample $E_{r1}$, and the corresponding D is used in Equation B.1. Thus, each D labels a corresponding band of values for $E_{r1}$. For example, if $E_{r1}$ is 412, this the band up to Emax=424, i.e. the range corresponding to D=13, and accordingly D=13 is used in Equation B.1. Thus, if $E_{r1}$ continues to stay at a certain level, say in the band up to Emax(D), the weight of the corresponding D value in the histogram will start to build up to become the maximum. It indicates that the current running average noise level is approximately Emax(D).

TABLE 1

| D | Emax (D) |
|---|---|
| 1 | 10 |
| 2 | 11 |
| 3 | 15 |
| 4 | 21 |
| 5 | 29 |
| 6 | 40 |
| 7 | 56 |
| 8 | 79 |
| 9 | 110 |
| 10 | 115 |
| 11 | 216 |
| 12 | 303 |
| 13 | 424 |
| 14 | 593 |
| 15 | 829 |
| 16 | 1161 |
| 17 | 1624 |
| 18 | 2274 |
| 19 | 3181 |
| 20 | 4452 |
| 21 | 6232 |
| 22 | 8724 |
| 23 | 12199 |
| 24 | 17686 |

After computing Pb and Pbs, the peak values of Pb and Pbs are labelled pp and pps respectively. pp is reset to be equal to (pps−5) if (pps−pp)>5.

Below is the pseudo-C which uses pp to estimate $T_{n1}$ and $T_{n2}$:

```
Np = Emax[pp];
Rpp = E_r1 /(E_r1 + Np);
gamma = sfun(Rpp, 0, 0.8);
E_p = gamma*E_p + (1 − gamma)*E_r1;
if (E_n >= E_p)
    E_n = 0.7*E_n + 0.3*E_p;
else if (E_r1 <= Er_old)
{
    E_n = 0.9995*E_n + 0.0005*E_p;
    Er_old = E_r1;
}
else
    E_n = 0.995*E_n + 0.005*E_p;
```

The Emax values in table 1 were chosen experimentally based on a statistical method. Samples (in this case, $E_{r1}$) were collected under certain environments (office, car, super-market, etc) and a histogram was generated based on the collected samples. From the histogram, a probability density function is computed and from there the Emax values were decided.

Similarly, all the factors in the first order recursive filters and the lower, upper limit of the s-function above are chosen empirically. Once the noise energy $E_n$ is obtained, the two signal detection thresholds $T_{n1}$ and $T_{n2}$ are established as follows:

$$T_{n1} = \delta_1 E_n \quad \text{B.5}$$

$$T_{n2} = \delta_2 E_n \quad \text{B.6}$$

$\delta_1$ and $\delta_2$ are scalar values that are used to select the thresholds so as to optimize signal detection and minimize false signal detection. As shown in FIG. 5, $T_{n1}$ should be above the system noise level, with $T_{n2}$ sufficient to be generally breached by the potential target signal. These factors may be found by trial and error. In this embodiment, $\delta_1 = 1.375$ and $\delta_2 = 1.675$ have been found to give good results.

In comparison to the algorithms for setting $T_{n1}$ and $T_{n2}$ in PCT/SG99/00119, the noise level can be tracked more robustly yet faster. A further motivation for the above algorithm for finding the thresholds is to distinguish between signal and noise in all environments, especially noisy environments (car, supermarket, etc.). This means that the user can use the embodiment any where.

Time Delay Estimation ($T_d$) (STEP 528)

FIG. 6A illustrates a single wave front impinging on the sensor array. The wave front impinges on sensor 10*d* first (A as shown) and at a later time impinges on sensor 10*a* (A' as shown), after a time delay $t_d$. This is because the signal originates at an angle of 40 degrees from the boresight direction. If the signal originated from the boresight direction, the time delay $t_d$ will have been zero ideally.

Time delay estimation of performed using a tapped delay line time delay estimator included in the processor 42 which is shown in FIG. 6B. The filter has a delay element 600, having a delay $Z^{-L/2}$ connected to the reference channel 10*a* and a tapped delay line filter 610 having a filter coefficient $W_{td}$ connected to channel 10*d*. Delay element 600 provides a delay equal to half of that of the tapped delay line filter 610. The outputs from the delay element is d(k) and from filter 610 is d'(k). The Difference of these outputs is taken at element 620 providing an error signal e(k) (where k is a time index used for ease of illustration). The error is fed back to the filter 610. The Least Mean Squares $$W_{td}(k+1) = W_{td}(k) + 2\mu_{td} S_{10d}(k) e(k) \quad \text{B.1}$$

(LMS) algorithm is used to adapt the filter coefficient $W_{td}$ as follows:

$$W_{td}(k+1) = \begin{bmatrix} W_{td}^0(k+1) \\ W_{td}^1(k+1) \\ \vdots \\ W_{td}^{Lo}(k+1) \end{bmatrix} \quad \text{B.2}$$

$$S_{10d}(k) = \begin{bmatrix} S_{10d}^0(k) \\ S_{10d}^1(k) \\ \vdots \\ S_{10d}^{Lo}(k) \end{bmatrix} \quad \text{B.3}$$

$$\mu_{td} = \frac{\beta_{td}}{\|S_{10d}(k)\|} \quad \text{B.6}$$

where $\beta_{td}$ is a user selected convergence factor $0 < \beta_{td} \leq 2$, $\|\ \|$ denoted the norm of a vector, k is a time index, $L_o$ is the filter length.

$$e(k) = d(k) - d'(k) \quad \text{B4}$$

$$d'(k) = W_{td}(k)^T \cdot S_{10d}(k) \quad \text{B.5}$$

The impulse response of the tapped delay line filter 620 at the end of the adaptation is shown in FIG. 6*c*. The impulse response is measured and the position of the peak or the maximum value of the impulse response relative to origin O gives the time delay $T_d$ between the two sensors which is also the angle of arrival of the signal. In the case shown, the peak lies at the centre indicating that the signal comes from the boresight direction ($T_d=0$). The threshold $\theta$ at step 506 is selected depending upon the assumed possible degree of departure from the boresight direction from which the target signal might come. In this embodiment, $\theta$ is equivalent to ±15°.

Normalized Cross Correlation Estimation $C_x$ (STEP 528)

The normalized crosscorrelation between the reference channel 10a and the most distant channel 10d is calculated as follows:

Samples of the signals from the reference channel 10a and channel 10d are buffered into shift registers X and Y where X is of length J samples and Y is of length K samples, where J>K, to form two independent vectors $X_r$ and $Y_r$:

$$X_r = \begin{bmatrix} x_r \\ x_r(2) \\ \vdots \\ x_r(J) \end{bmatrix} \quad \text{C.1}$$

$$Y_r = \begin{bmatrix} y_r \\ y_r(2) \\ \vdots \\ y_r(K) \end{bmatrix} \quad \text{C.2}$$

A time delay between the signals is assumed, and to capture this Difference, J is made greater than K. The Difference is selected based on angle of interest. The normalized cross-correlation is then calculated as follows:

$$C_x(l) = \frac{Y_r^T * X_{rl}}{\|Y_r\| * \|X_{rl}\|} \quad \text{C.3}$$

$$\text{Where} \ldots X_{rl} = \begin{bmatrix} X_r \\ X_r(l+1) \\ \vdots \\ x_r(K+l-1) \end{bmatrix} \quad \text{C.4}$$

Where $^T$ represents the transpose of the vector and $||$ represent the norm of the vector and I is the correlation lag. I is selected to span the delay of interest. For a sampling frequency of 16 kHz and a spacing between sensors 10a, 10d of 18 cm, the lag I is selected to be five samples for an angle of interest of 15°.

The threshold $T_c$ is determined empirically. $T_c=0.65$ is used in this embodiment.

Block Leak Compensation LMS for Time Delay Estimation (STEP 526)

In the time delay estimation LMS algorithm, a modified leak compensation form is used. This is simply implemented by:

$W_{td} = \alpha W_{td}$ (where $\alpha$=forgetting_factor~=0.98)

This leak compensation form has the property of adapting faster to the direction of fast changing sources and environment.

Filter Coefficient Peak Ratio, $P_k$ (STEP 528)

The impulse response of the tapped delay line filter with filter coefficients $W_{td}$ at the end of the adaptation with the present of both signal and interference sources is shown in FIG. 7. The filter coefficient $W_{td}$ is as follows:

$$W_{td}(k) = \begin{bmatrix} W_{td}^0(k) \\ W_{td}^1(k) \\ \vdots \\ W_{td}^{L0}(k) \end{bmatrix}$$

With the present of both signal and interference sources, there will be more than one peak at the tapped delay line filter coefficient. The $P_k$ ratio is calculated as follows:

$$A = \text{Max} W_{td}^n$$

$$\text{where } \frac{L0}{2} - \Delta \le n \le \frac{L0}{2} + \Delta$$

$$B = \text{Max} W_{td}^n$$

$$\text{where } 0 \le n < \frac{L0}{2} - \Delta, \frac{L0}{2} + \Delta < n$$

$$P_k = \frac{A}{A+B}$$

$\Delta$ is calculated base on the threshold $\theta$ at step 530. In this embodiment, with $\theta$ equal to ±15°, $\Delta$ is equivalent to 2. A low $P_k$ ratio indicates the present of strong interference signals over the target signal and a high $P_k$ ratio shows high target signal to interference ratio.

Adaptive Spatial Filter 44 (STEPS 532-536)

FIG. 8 shows a block diagram of the Adaptive Linear Spatial Filter 44. The function of the filter is to separate the coupled target interference and noise signals into two types. The first, in a single output channel termed the Sum Channel, is an enhanced target signal having weakened interference and noise i.e. signals not from the target signal direction. The second, in the remaining channels termed Difference Channels, which in the four channel case comprise three separate outputs, aims to comprise interference and noise signals alone.

The objective is to adopt the filter coefficients of filter 44 in such a way so as to enhanced the target signal and output it in the Sum Channel and at the same time eliminate the target signal from the coupled signals and output them into the Difference Channels.

The adaptive filter elements in filter 44 acts as linear spatial prediction filters that predict the signal in the reference channel whenever the target signal is present. The filter stops adapting when the signal is deemed to be absent.

The filter coefficients are updated whenever the conditions of steps are met, namely:
  i. The adaptive threshold detector detects the presence of signal;
  ii. The peak ratio exceeds a certain threshold;
  iii. The running $R_{sd}$ exceeds a certain threshold;

As illustrate in FIG. 8, the digitized coupled signal $X_0$ from sensor 10a is fed through a digital delay element 710 of delay $Z^{-Lsu/2}$. Digitized coupled signals $X_1, X_2, X_3$ from sensors 10b, 10c, 10d are fed to respective filter elements 712,4,6. The outputs from elements 710,2,4,6 are summed at Summing element 718, the output from the Summing element 718 being divided by four at the divider element 719 to form the Sum channel output signal. The output from delay element 710 is also subtracted from the outputs of the filters 712,4,6 at respective Difference elements 720,2,4, the output from each Difference element forming a respective Difference channel output signal, which is also fed back to the respective filter 712,4,6. The function of the delay element 710 is to time align the signal from the reference channel 10a with the output from the filters 712,4,6.

The filter elements 712,4,6 adapt in parallel using the normalized LMS algorithm given by Equations E.1 . . . E.8 below, the output of the Sum Channel being given by equation E.1 and the output from each Difference Channel being given by equation E.6:

$$\hat{S}_c(k) = \frac{\overline{S}(k) + \overline{X}_0(k)}{4} \quad \text{E.1}$$

$$\text{Where: } \overline{S}(k) = \sum_{m=1}^{M-1} \overline{S}_m(k) \quad \text{E.2}$$

$$\overline{S}_m(k) = (W_{su}^m(k))^T X_m(k) \quad \text{E.3}$$

Where m is 0, 1, 2 . . . M−1, the number of channels, in this case 0 . . . 3 and $T$ denotes the transpose of a vector;

$$X_m(k) = \begin{bmatrix} X_{1m}(k) \\ X_{2m}(k) \\ \vdots \\ X_{LSUm}(k) \end{bmatrix} \quad \text{E.4}$$

$$W_{su}^m(k) = \begin{bmatrix} W_{su1}^m(k) \\ W_{su2}^m(k) \\ \vdots \\ W_{suLSU}^m(k) \end{bmatrix} \quad \text{E.5}$$

Where $X_m(k)$ and $W_{su}^m(k)$ are column vectors of dimension (Lsu×1).

The weight $X_m(k)$ is updated using the normalized LMS algorithm as follows:

$$\delta_{cm}(k) = \overline{X}_0(k) - \overline{S}_m(k) \quad \text{E.6}$$

$$W_{su}^m(k+1) = W_{su}^m(k) + 2\mu_{su}^m X_m(k)\partial_{cm}(k) \quad \text{E.7}$$

$$\text{Where: } \mu_{su}^m = \frac{\beta_{su}}{\|X_m(k)\|} \quad \text{E.8}$$

and where $\beta_{su}$ is a user selected convergence factor $0 < \beta_{su} \leq 2$, $\|\ \|$ denoted the norm of a vector and k is a time index.

Running $R_{sd}$ within Adaptive Spatial Filter (STEP 532)

To prevent filter coefficients being updated wrongly, conditions for updating a block of N/2 samples is insufficient. Running $R_{sd}$ is computed every N/2 samples and it's being used with other conditions to test whether that particular sample should update or not.

Running $R_{sd}$ is calculated as follows:

$$\overline{rsd} = \frac{\overline{E_{sum}}}{\overline{E_{sum}} + \overline{E_{err}}} \quad \text{F.9}$$

Where:

$$\overline{E_{sum}} = 0.98\overline{E_{sum}} + 0.02\{\text{abs}[(\hat{S}_c(k+1))^2 - \hat{S}_c(k)\hat{S}_c(k+2)]\} \quad \text{F.10}$$

$$\overline{E_{err}} = 0.98\overline{E_{err}} + 0.02(\text{abs}[(\partial_{cm}(k+1))^2 - \partial_{cm}(k)\partial_{cm}(k+2)]) \quad \text{F.11}$$

Adaptive Spatial Filter Coefficient Restoration (STEPS 540-546)

In the events of wrong updating, the coefficients of the filter could adapt to the wrong direction or sources. To reduce the effect, a set of 'best coefficients' is kept and copied to the beam-former coefficients when it is detected to be pointing to a wrong direction, after an update.

Two mechanisms are used for these:

A set of 'best weight' includes all of the three filter coefficients ($W_{su}^1 - W_{su}^3$). They are saved based on the following conditions:

When there is an update on filter coefficients $W_{su}$, the calculated $P_{k2}$ ratio is compared with the previous stored $B_{Pk}$, if it is above the $B_{Pk}$, this new set of filter coefficients shall become the new set of 'best weight' and current $P_{k2}$ ratio is saved as the new $B_{Pk}$.

A second mechanism is used to decide when the filter coefficients should be restored with the saved set of 'best weights'. This is done when filter coefficients are updated and the calculated $P_{k2}$ ratio is below $B_{Pk}$ and threshold $T_{Pk}$. In this embodiment, the value of $T_{Pk}$ is equal to 0.65.

Calculation of Energy Ratio $R_{sd}$ (STEP 548)

This is performed as follows:

$$\hat{S}_c = \begin{bmatrix} \hat{S}_c(0) \\ \hat{S}_c(1) \\ \vdots \\ \hat{S}_c(J-1) \end{bmatrix} \quad \text{F.1}$$

$$\hat{D}_c = \begin{bmatrix} \hat{d}_c(0) \\ \hat{d}_c(1) \\ \vdots \\ \hat{d}_c(J-1) \end{bmatrix} \quad \text{F.2}$$

$$= \begin{bmatrix} \hat{d}_{c1}(0) \\ \hat{d}_{c1}(1) \\ \vdots \\ \hat{d}_{c1}(J-1) \end{bmatrix} + \begin{bmatrix} \hat{d}_{c2}(0) \\ \hat{d}_{c2}(1) \\ \vdots \\ \hat{d}_{c2}(J-1) \end{bmatrix} + \begin{bmatrix} \hat{d}_{c3}(0) \\ \hat{d}_{c3}(1) \\ \vdots \\ \hat{d}_{c3}(J-1) \end{bmatrix}$$

J=N/2, the number of samples, in this embodiment 256.

Where $E_{SUM}$ is the sum channel energy and $E_{DIF}$ is the difference channel energy.

$$E_{SUM} = \frac{1}{J-2}\sum_{j=1}^{J-2}\hat{S}_c(j)^2 - \hat{S}_c(j-1)\hat{S}_c(j-1) \quad \text{F.3}$$

$$E_{DIF} = \frac{1}{3(J-2)}\sum_{j=1}^{J-2}\hat{d}_c(j)^2 - \hat{d}_c(j-1)\hat{d}_c(j-1) \quad \text{F.4}$$

$$R_{sd} = \frac{E_{SUM}}{E_{DIF}} \quad \text{F.5}$$

The energy ratio between the Sum Channel and Difference Channel ($R_{sd}$) must not exceed a predetermined threshold. In the four channel case illustrated here the threshold is determined to be about 1.5.

Calculation of Power Ratio $P_{rsd}$ (STEP 548)

This is performed as follows:

$$\hat{S}_c = \begin{bmatrix} \hat{S}_c(0) \\ \hat{S}_c(1) \\ \vdots \\ \hat{S}_c(J-1) \end{bmatrix}$$

$$\hat{\partial}_c = \begin{bmatrix} \hat{\partial}_c(0) \\ \hat{\partial}_c(1) \\ \vdots \\ \hat{\partial}_c(J-1) \end{bmatrix} = \begin{bmatrix} \hat{\partial}_{c1}(0) \\ \hat{\partial}_{c1}(1) \\ \vdots \\ \hat{\partial}_{c1}(J-1) \end{bmatrix} + \begin{bmatrix} \hat{\partial}_{c2}(0) \\ \hat{\partial}_{c2}(1) \\ \vdots \\ \hat{\partial}_{c2}(J-1) \end{bmatrix} + \begin{bmatrix} \hat{\partial}_{c3}(0) \\ \hat{\partial}_{c3}(1) \\ \vdots \\ \hat{\partial}_{c3}(J-1) \end{bmatrix}$$

J=N/2, the number of samples, in this embodiment 128.

Where $P_{SUM}$ is the sum channel power and $P_{DIF}$ is the difference channel power.

$$P_{SUM} = \frac{1}{J} \sum_{j=0}^{J-1} \hat{S}_c(j)^2$$

$$P_{DIF} = \frac{1}{3(J)} \sum_{j=0}^{J-1} \hat{\partial}_c(j)^2$$

$$P_{rsd} = \frac{P_{SUM}}{P_{DIF}}$$

The power ratio between the Sum Channel and Difference Channel must not exceed a dynamic threshold, $T_{Prsd}$.

Calculation of Energy Ratio Factor $R_{sdf}$ (STEP 548)

This Energy Ratio Factor $R_{sdf}$ is obtained by passing the $R_{sd}$ to a non-linear S-shape transfer function as shown in FIG. 9. Certain range of the $R_{sd}$ value can be boosted up or suppressed by changing the shape of the transfer function using different sets of threshold level, $S_L$ and $S_H$.

Dynamic Noise Power Threshold Updating $T_{Prsd}$ (STEP 550)

This dynamic noise power threshold, $T_{Prsd}$ is updated base on the following conditions:

If the reference channel signal energy is more than 700 and power ratio is less than 0.45 for 64 consecutive processing blocks, $$T_{Prsd} = \alpha_1 * T_{Prsd} + (1-\alpha_1) * P_{rsd}$$

Else if the reference channel signal energy is less than 700, then $$T_{Prsd} = \alpha_2 * T_{Prsd} + (1-\alpha_2) * \text{Max\_Prsd}$$

In this embodiment, $\alpha_1=0.67$, $\alpha_2=0.98$ and Max_Prsd=1.3 have been found to give good results.

Adaptive Interference Filter 46 (STEPS 554-558)

FIG. 10 shows a schematic block diagram of the Adaptive Interference Filter 46. This filter adapts to interference signal and subtracts it from the Sum Channel so as to derive an output with reduced interference noise.

The filter 46 takes outputs from the Sum and Difference Channels of the filter 44 and feeds the Difference Channel Signals in parallel to another set of adaptive filter elements 750,2,4 and feed the Sum Channel signal to a corresponding delay element 756. The outputs from the three filter elements 750,2,4 are subtracted from the output from delay element 756 at Difference element 758 to form and error output $e_{c1}$, which is fed back to the filter elements 750,2,4. The output from filter 44 is also passed to an Adaptive Signal Multiplexer to mix with filter output from filter 48 and subtract it from the Sum Channel.

Again, the Least Mean Square algorithm (LMS) is used to adapt the filter coefficients Wuq as follows:

$$e_{c1}(k) = \hat{S}_c(k) - S_i(k) \tag{I.1}$$

Where $$S_1(k) = \sum_{m=1}^{M-1} \partial_{cm}(k) \text{ and } \partial_{cm}(k) = W_{uq}^m(k)^T \cdot Y^m(k) \tag{I.2}$$

$$Y^m(k) = \begin{bmatrix} \partial_{c1m}(k) \\ \partial_{c2m}(k) \\ \vdots \\ \partial_{cLuqm}(k) \end{bmatrix} \tag{I.3}$$

$$W_{uq}^m(k+1) = W_{uq}^m(k) + 2\mu_{uq}^m Y^m(k) e_{c1}(k) \tag{I.4}$$

$$\mu_{no}^m = \frac{\beta_{no}}{\|Y^m\| + \|e_{c1}\|} \tag{I.5}$$

and where $\beta_{uq}$ is a user select factor $0 < \beta_{uq} \leq 2$ and where m is 0, 1, 2 ... M−1, the number of channels, in this case 0 ... 3.

When only target signal is present and the Interference filter is updated wrongly, the error signal in equation I.1 will be very large and the norm of $Y^m$ will be very small. Hence, by including norm of error signal $\|e_{c1}\|$ into weight updating μ calculation (equation I.5), the μ will become very small whenever there is a wrong updating of Interference filter occur. This step help to prevent a wrong updating of weight coefficients of Interference filter and hence reduce the effect of signal cancellation.

Adaptive Ambient Noise Estimation Filter 48 (STEPS 562-566)

FIG. 11 shows a schematic block diagram of the Adaptive Ambient Noise Estimation Filter 48. This filter adapts to the environment noise and subtracts it from the Sum Channel so as to derive an output with reduced noise.

The filter 48 takes outputs from the Sum and Difference Channels of the filter 44 and feeds the Difference Channel Signals in parallel to another set of adaptive filter elements 760,2,4 and feed the Sum Channel signal to a corresponding delay element 766. The outputs from the three filter elements 760,2,4 are subtracted from the output from delay element 766 at Difference element 768 to form and error output $e_{c2}$, which is fed back to the filter elements 760,2,4. The output from filter 48 also passed to an Adaptive Signal Multiplexer to mix with filter output from filter 46 and subtract it from the Sum Channel.

Again, the Least Mean Square algorithm (LMS) is used to adapt the filter coefficients $W_{no}$ as follows:

$$e_{c2}(k) = \hat{S}_c(k) - S_n(k)$$

Where:

$$S_n(k) = \sum_{m=1}^{M-1} \partial_{cm}(k) \text{ and } \partial_{cm}(k) = W_{no}^m(k)^T \cdot Y^m(k)$$

$$Y^m(k) = \begin{bmatrix} \partial_{c1m}(k) \\ \partial_{c2m}(k) \\ \vdots \\ \partial_{cLnom}(k) \end{bmatrix}$$

$$W_{no}^m(k+1) = W_{no}^m(k) + 2\mu_{no}^m Y^m(k) e_{c2}(k)$$

$$\mu_{no}^m = \frac{\beta_{no}}{\|Y^m\|}$$

and where $\beta_{no}$ is a user select factor $0<\beta_{no}\leq 2$ and where m is 0, 1, 2 ... M−1, the number of channels, in this case 0 ... 3.

Adaptive Signal Multiplexer (STEP 568)

FIG. 12 shows a schematic block diagram of the Adaptive Signal Multiplexer. This multiplexer adaptively multiplex the output from interference filter 46 $S_i$ and ambient noise filter 48 $S_n$ to produce two interference signals $I_c$ and $I_s$ as follows:

$$I_c(t) = W_{e1} S_i(t) + W_{e2} S_n(t)$$

$$I_s(t) = W_{n1} S_i(t) + W_{n2} S_n(t)$$

The weights ($W_{e1}$, $W_{e2}$) and ($W_{n1}$, $W_{n2}$) can be changed base on different input signal environment conditions to minimize signal cancellation or improve unwanted signal suppression. In this embodiment, the weights are determined base on the following conditions:

If target signal is detected and updating condition for filter 46 (552) and filter 48 (560) are false then $W_{e1}=0$, $W_{e2}=1.0$, $W_{n1}=0.8$ and $W_{n2}=1.0$.

Else if no target signal is detected and updating condition for filter 46 (552) is true then $W_{e1}=1.0$, $W_{e2}=1.0$, $W_{n1}=1.0$ and $W_{n2}=1.0$.

Else if no target signal is detected and updating condition for filter 46 (552) is false and updating condition for filter 48 (560) is true then $W_{e1}=0$, $W_{e2}=1.0$, $W_{n1}=1.0$ and $W_{n2}=1.0$.

$I_c$ is subtracted from the Sum Channel $\hat{S}_c$ so as to derive an output $e_s$ with reduced noise and interference. This output $e_s$ is almost interference and noise free in an ideal situation. However, in a realistic situation, this cannot be achieved. This will cause signal cancellation that degrades the target signal quality or noise or interference will feed through and this will lead to degradation of the output signal to noise and interference ratio. The signal cancellation problem is reduced in the described embodiment by use of the Adaptive Spatial Filter 44, which reduces the target signal leakage into the Difference Channel. However, in cases where the signal to noise and interference is very high, some target signal may still leak into these channels.

To further reduce the target signal cancellation problem and unwanted signal feed through to the output, the other output signal from Adaptive Signal Multiplexer $I_s$ is fed into the Adaptive Non-Linear Interference and Noise Suppression Processor 50.

Adaptive Non-Linear Interference and Noise Suppression Processor 50 (STEPS 570-590)

This processor processes input signals in the frequency domain coupled with the well-known overlap add block-processing technique.

$S_c(t)$, $e_s(t)$ and $I_s(t)$ is buffered into a memory as illustrated in FIG. 13. The buffer consists of N/2 of new samples and N/2 of old samples from the previous block.

A Hanning Window is then applied to the N samples buffered signals as illustrated in FIG. 14 expressed mathematically as follows:

$$S_h = \begin{bmatrix} S_c(t+1) \\ S_c(t+2) \\ \vdots \\ S_c(t+N) \end{bmatrix} \cdot H_n \quad (H.3)$$

$$E_h = \begin{bmatrix} e_s(t+1) \\ e_s(t+2) \\ \vdots \\ e_s(t+N) \end{bmatrix} \cdot H_n \quad (H.4)$$

$$I_h = \begin{bmatrix} I_s(t+1) \\ I_s(t+2) \\ \vdots \\ I_s(t+N) \end{bmatrix} \cdot H_n \quad (H.5)$$

Where ($H_n$) is a Hanning Window of dimension N, N being the dimension of the buffer. The "dot" denotes point-by-point multiplication of the vectors. T is a time index.

The resultant vectors [$S_h$], [$E_h$] and [$I^h$] are transformed into the frequency domain using Fast Fourier Transform algorithm as illustrated in equation H.6, H.7 and H.8 below:

$$S_f = \text{FFT}(S_h) \quad (H.6)$$

$$E_f = \text{FFT}(E_h) \quad (H.7)$$

$$I_f = \text{FFT}(I_h) \quad (H.8)$$

A modified spectrum is then calculated, which is illustrated in Equations H.9 and H.10:

$$P_s = |Re(S_f)| + |Im(S_f)| + F(S_f) * r_s \quad (H.9)$$

$$P_I = |Re(I_f)| + |Im(I_f)| + F(S_f) * r_i \quad (H.10)$$

Where "Re" and "Im" refer to taking the absolute values of the real and imaginary parts, rs and ri are scalars and $F(S_f)$ and $F(I_f)$ denotes a function of $S_f$ and $I_f$ respectively.

One preferred function F using a power function is shown below in equation H.11 and H.12 where "Conj" denotes the complex conjugate:

$$P_s = |Re(S_f)| + |Im(S_f)| + (S_f * \text{conj}(S_f)) * r_s \quad (H.11)$$

$$P_i = |Re(I_f)| + |Im(I_f)| + (I_f * \text{conj}(I_f)) * r_i \quad (H.12)$$

A second preferred function F using a multiplication function is shown below in equations H.13 and H.14:

$$P_s = |Re(S_f)| + |Im(S_f)| + |Re(S_f)| * |Im(S_f)| * r_s \quad (H.13)$$

$$P_i = |Re(I_f)| + |Im(I_f)| + |Re(I_f)| * |Im(I_f)| * r_i \quad (H.14)$$

The values of the scalars ($r_s$ and $r_i$) control the tradeoff between unwanted signal suppression and signal distortion and may be determined empirically. ($r_s$ and $r_i$) are calculated as $1/(2^{vs})$ and $1/(2^{vi})$ where vs and vi are scalars. In this embodiment, vs=vi is chosen as 8 giving $r_s=r_i=1/256$. As vs, vi reduce, the amount of suppression will increase.

Frequency Scan for Similar Peak Between $P_s$ and $P_i$ $P_i$ may contain some of the frequency components of $P_s$ due to the wrong estimation of $P_i$. Therefore, frequency scanning is applied to both $P_s$ and $P_i$ to look for the peaks in the same frequency components. For those peaks in $P_i$ is then multiplied by an attenuation factor which is chosen to be 0.1 in this case.

The Spectra $(P_s)$ and $(P_i)$ are warped into (Nb) critical bands using the Bark Frequency Scale [See Lawrence Rabiner and Bing Hwang Juang, Fundamental of Speech Recognition, Prentice Hall 1993]. The number of Bark critical bands depends on the sampling frequency used. For a sampling of 16 kHz, there will be Nb=22 critical bands. The warped Bark Spectrum of $(P_s)$ and $(P_i)$ are denoted as $(B_s)$ and $(B_i)$.

Voice Unvoiced Detection and Amplification

This is used to detect voice or unvoiced signal from the Bark critical bands of sum signal and hence reduce the effect of signal cancellation on the unvoiced signal. It is performed as follows:

$$B_s = \begin{bmatrix} B_s(0) \\ B_s(1) \\ \vdots \\ B_s(Nb) \end{bmatrix}$$

$$V_{sum} = \sum_{n=0}^{k} B_s(n)$$

where $k$ is the voice band upper cutoff $$U_{sum} = \sum_{n=l}^{Nb} B_s(n)$$

where $l$ is the unvoiced band lower cutoff $$\text{Unvoice\_Ratio} = \frac{U_{sum}}{V_{sum}}$$

If Unvoice_Ratio>Unvoice_Th $B_s(n)=B_s(n) \times A$ where $1 \leq n \leq Nb$

In this embodiment, the value of voice band upper cutoff k, unvoiced band lower cutoff I, unvoiced threshold Unvoice_Th and amplification factor A is equal to 16, 18, 10 and 8 respectively.

A Bark Spectrum of the system noise and environment noise is similarly computed and is denoted as $(B_n)$. $B_n$ is first established during system initialization as $B_n=B_s$ and continues to be updated when no target signal is detected (step) by the system i.e. any silence period. $B_n$ is updated as follows:

```
if ((E_r3 < T_n1) || (loop_cnt < 20))
{
    if (E_r3 < nl1)}
        α = 0.98;
    else
        α = 0.90;
    nl1 = α*nl1 + (1 - α)*E_r1;
    B_n = α*B_n + (1 - α)*B_s;
}
```

Using $(B_s, B_i$ and $B_n)$ a non-linear technique is used to estimate a gain $(G_b)$ as follows:

First the unwanted signal Bark Spectrum is combined with the system noise Bark Spectrum by using as appropriate weighting function as illustrate in Equation J.1.

$$B_y = \Omega_1 B_i + \Omega_2 B_n \tag{J.1}$$

$\Omega_1$, and $\Omega_2$ are weights whose can be chosen empirically so as to maximize unwanted signals and noise suppression with minimized signal distortion. In this embodiment, $\Omega_1=1.0$ and $\Omega_2=0.25$.

Following that a post signal to noise ratio is calculated using Equation J.2 and J.3 below:

$$R_{po} = \frac{B_s}{B_y} \tag{J.2}$$

$$R_{pp} = R_{po} - I_{Nb \times 1} \tag{J.3}$$

The division in equation J.2 means element-by-element division and not vector division. $R_{po}$ and $R_{pp}$ are column vectors of dimension (Nb×1), Nb being the dimension of the Bark Scale Critical Frequency Band and $I_{Nb \times 1}$ is a column unity vector of dimension (Nb×1) as shown below:

$$R_{po} = \begin{bmatrix} r_{po}(1) \\ r_{po}(2) \\ \vdots \\ r_{po}(Nb) \end{bmatrix} \tag{J.4}$$

$$R_{pp} = \begin{bmatrix} r_{pp}(1) \\ r_{pp}(2) \\ \vdots \\ r_{pp}(Nb) \end{bmatrix} \tag{J.5}$$

$$I_{Nbx1} = \begin{bmatrix} 1 \\ 1 \\ \vdots \\ 1 \end{bmatrix} \tag{J.6}$$

If any of the $r_{pp}$ elements of $R_{pp}$ are less than zero, they are set equal to zero.

Using the Decision Direct Approach [see Y. Ephraim and D. Malah: Speech Enhancement Using Optimal Non-Linear Spectrum Amplitude Estimation; Proc. IEEE International Conference Acoustics Speech and Signal Processing (Boston) 1983, pp1118-1121.], the a-priori signal to noise ratio $R_{pr}$ is calculated as follows:

$$R_{pr} = (1 - \beta_i) * R_{pp} + \beta_i * \frac{B_o}{B_y} \tag{J.7}$$

The division in Equation J.7 means element-by-element division. $B_o$ is a column vector of dimension (Nb×1) and denotes the output signal Bark Scale Bark Spectrum from the previous block $B_o=G_b \times B_s$, (See Equation J.15) ($B_o$ initially is zero). $R_{pr}$ is also a column vector of dimension (Nb×1). The value of $\beta_i$ is given in Table 2 below:

TABLE 2

| | | | i | | |
|---|---|---|---|---|---|
| | 1 | 2 | 3 | 4 | 5 |
| $\beta_i$ | 0.01625 | 0.1225 | 0.245 | 0.49 | 0.98 |

The value i is set equal to 1 on the onset of a signal and $\beta_i$ value is therefore equal to 0.01625. Then the i value will count from 1 to 5 on each new block of N/2 samples processed and stay at 5 until the signal is off. The i will start from 1 again at the next signal onset and the $\beta_i$ is taken accordingly.

Instead of $\beta_i$ being constant, in this embodiment $\beta_i$ is made variable and starts at a small value at the onset of the signal to prevent suppression of the target signal and increases, preferably exponentially, to smooth $R_{pr}$.

From this, $R_{rr}$ is calculated as follows:

$$R_{rr} = \frac{R_{pr}}{I_{Nbx1} + R_{pr}} \tag{J.8}$$

The division in Equation J.8 is again element-by-element. $R_{rr}$ is a column vector of dimension (Nb×1).

From this, $L_x$ is calculated:

$$L_x = R_{rr} \cdot R_{po} \tag{J.9}$$

The value $L_x$ of is limited to Pi (≈3.14). The multiplication is Equation J.9 means element-by-element multiplication. $L_x$ is a column vector of dimension (Nb×1) as shown below:

$$L_x = \begin{bmatrix} l_x(1) \\ l_x(2) \\ \vdots \\ l_x(nb) \\ \vdots \\ l_x(Nb) \end{bmatrix} \tag{J.10}$$

A vector $L_y$ of dimension (Nb×1) is then defined as:

$$L_y = \begin{bmatrix} l_y(1) \\ l_y(2) \\ \vdots \\ l_y(nb) \\ \vdots \\ l_y(Nb) \end{bmatrix} \tag{J.11}$$

Where nb=1,2 ... Nb. Then $L_y$ is given as:

$$l_y(nb) = \exp\left(\frac{E(nb)}{2}\right) \tag{J.12}$$

and $$E(nb) = -0.57722 - \log(l_x(nb)) + l_x(nb) - \frac{(l_x(nb))^2}{4} + \frac{(l_x(nb))^3}{8} - \frac{(l_x(nb))^4}{96} \cdots \tag{J.13}$$

E(nb) is truncated to the desired accuracy. $L_y$ can be obtained using a look-up table approach to reduce computational load.

Finally, the Gain $G_b$ is calculated as follows:

$$G_b = R_{rr} \cdot L_y \tag{J.14}$$

The "dot" again implies element-by-element multiplication. $G_b$ is a column vector of dimension (Nb×1) as shown:

$$G_b = \begin{bmatrix} g(1) \\ g(2) \\ \vdots \\ g(nb) \\ \vdots \\ g(Nb) \end{bmatrix} \tag{J.15}$$

As $G_b$ is still in the Bark Frequency Scale, it is then unwrapped back to the normal linear frequency scale of N dimensions. The unwrapped $G_b$ is denoted as G.

The output spectrum with unwanted signal suppression is given as:

$$\overline{S}_f = (1 - \text{Rsdf}) \cdot G \cdot S_f + \text{Rsdf} \cdot E_f \tag{J.16}$$

The "·" again implies element-by-element multiplication. In eqn J.16 if $R_{sdf}$ is high (implying high signal energy to interference energy) the output signal spectrum is weighted more from $E_f$ than the Noise suppression part ($G \cdot S_f$) to prevent signal cancellation caused by the noise suppression part.

The recovered time domain signal is given by:

$$\overline{S}_t = \text{Re}(\text{IFFT}(\overline{S}_f)) \tag{J.17}$$

IFFT denotes an Inverse Fast Fourier Transform, with only the Real part of the inverse transform being taken.

Finally, the output time domain signal is obtained by overlap add with the previous block of output signal:

$$\hat{S}_t = \begin{bmatrix} \overline{S}_t(1) \\ \overline{S}_t(2) \\ \vdots \\ \overline{S}_t(N/2) \end{bmatrix} + \begin{bmatrix} Z_t(1) \\ Z_t(2) \\ \vdots \\ Z_t(N/2) \end{bmatrix} \tag{J.18}$$

$$\text{Where: } Z_t = \begin{bmatrix} \overline{S}_{t-1}(1 + N/2) \\ \overline{S}_{t-1}(2 + N/2) \\ \vdots \\ \overline{S}_{t-1}(N) \end{bmatrix} \tag{J.19}$$

The embodiment described is not to be construed as limitative. For example, there can be any number of channels from two upwards. Furthermore, as will be apparent to one skilled in the art, many steps of the method employed are essentially discrete and may be employed independently of the other steps or in combination with some but not all of the other steps. For example, the adaptive filtering and the frequency domain processing may be performed independently of each other and the frequency domain processing steps such as the use of the modified spectrum, warping into the Bark scale and use of the scaling factor pi can be viewed as a series of independent tools which need not all be used together.

Turning now to FIGS. 16 and 17, an embodiment of the invention is shown which is a headset system. As shown schematically in FIG. 16, the system has two units, namely a base station 71 and a mobile unit 72.

The base unit provides connection to any host system 73 (such as a PC) through a USB (universal serial bus). It acts as a router for steaming audio information between the host system and the mobile unit 72. It is formed with a cradle (not shown) for receiving and holding the mobile unit 72. The cradle is preferably provided with a charging unit cooperating with a rechargeable power source which is part of the mobile unit 72. The charging unit charges the power source while the mobile unit 72 is held by the cradle.

The base unit 71 includes at least one aerial 74 for two-way wireless communication with at least one aerial 75 of the mobile unit 72. The mobile unit includes a loadspeaker 76 (shown physically connected to the mobile unit 72 by a wire, though as explained below, this is not necessary), and at least two microphones (audio sensors) 77. The wireless link between mobile unit 72 and base station 71 is a highly secure RF Bluetooth link.

FIG. 17 shows the mobile unit 72 in more detail. It has a structure defining an open loop 78 to be placed around the head or neck of a user, for example so as to be supported on the user's shoulders. At the two ends of the loop are multiple microphones 77 (normally 2 or 4 in total), to be placed in proximity of the user's mouth for receiving voice input. One of more batteries 79 may be provided near the microphones 76. In this case there are two antennas 75 embedded in the structure. Away from the antennas, the loop 78 is covered with RF absorbing material. A rear portion 80 of the loop is a flex-circuit containing digital signal processing and RF circuitry.

The system further includes an ear speaker (not shown) magnetically coupled to the mobile unit 72 by components (not shown) provided on the mobile unit 72. The user wears the ear speaker in one of his ears, and it allows audio output from the host system 73. This enables two-way communication applications, such as internet telephony and other speech and audio applications.

Preferably, the system includes digital circuitry carrying out a method according to the invention on audio signals received by the multiple microphones 76. Some or all of the circuitry can be within the circuitry 80 and/or within the base unit 71.

FIGS. 18(a) and 18(b) show two ways in which a user can wear the mobile unit 72 having the shape illustrated in FIG. 17. In FIG. 18(a) the user wears the mobile unit 72 resting on the top of his head with the microphones close to his mouth. In FIG. 18(b) the user has chosen to wear the mobile unit 72 supported by his shoulders and with the two arms of the loop embracing his neck, again with the microphone close to his mouth.

Use of first, second etc. in the claims should only be construed as a means of identification of the integers of the claims, not of process step order. Any novel feature or combination of features disclosed is to be taken as forming an independent invention whether or not specifically claimed in the appendant claims of this application as initially filed.

The invention claimed is:

1. A headset system including a base unit and a headset unit for wearing by a user and having a plurality of microphones, the headset unit and base unit being arranged for mutual wireless communication, and at least one of the base unit and the headset unit comprising at least one digital signal processing unit arranged to perform signal processing in the time domain on audio signals received by the plurality of microphones, the at least one digital signal processing unit including a first adaptive filter configured to enhance a wanted signal in the audio signals, a second adaptive filter and a third adaptive filter each configured to receive an output of the first adaptive filter, the second adaptive filter being configured to reduce an unwanted interference signal in the audio signals, and the third adaptive filter being arranged to estimate noise signals.

2. A headset system according to claim 1, in which the base unit comprises a cradle configured to hold the headset unit.

3. A headset system according to claim 1, in which the headset unit is associated with a loudspeaker operable by the headset unit for generating audio signals to the user.

4. A headset system according to claim 1, the at least one digital processing unit being adapted to combine output signals of the second and third adaptive filters, convert the combined signals to the frequency domain and perform further processing in the frequency domain.

5. A headset system according to claim 4, configured to linearly combine an output $S_i(t)$ of the second adaptive filter and an output $S_n(t)$ of the third adaptive filter using weighting factors to derive two interference signals, to subtract a first of the interference signals Ic from the output of the first adaptive filter, and to convert a second of the interference signals Is into the frequency domain.

6. A headset system according to claim 1, configured so that the second and third adaptive filters are not adapted if it is determined that a target signal is present.

7. A headset system according to claim 1, configured so that the second adaptive filter is not adapted if it is determined that an interference signal is not present.

8. A headset system according to claim 6, further, configured to determine signal energy at intervals, and to derive at least one noise threshold from a plurality of values of the signal energy, said determination including a determination of whether a further signal energy is above the at least one noise threshold.

9. A headset system according to claim 8, further configured so that the derivation of said at least one noise threshold includes using the plurality of values of the signal energy to derive a histogram representing the statistical frequencies of signal energy values in each of a number of bands, and deriving the at least one noise threshold from a signal energy value Emax associated with the band having the highest histogram value.

10. A headset system according to claim 1, in which the at least one digital signal processing unit comprises a fourth adaptive filter configured to determine a direction of arrival of the wanted signal.

11. A headset system according to claim 10, configured for the weights of the fourth adaptive filter to be updated, including being configured to repeatedly perform an update process which attenuates each existing weight value by a forgetting factor α.

12. A headset system according to claim 10, the at least one digital signal processing unit being configured to determine a ratio $P_k$ indicating the ratio of the highest central weight value A of the fourth adaptive filter to the sum of A and the highest peripheral weight value B, the at least one digital signal processing unit being configured only to adapt the first filter if the ratio $P_k$ is above a given value $T_{pk1}$.

13. A headset system according to claim 12, in which, following an adaptation of the first filter, the at least one digital signal processing means unit is configured to calculate a new value $P_{k2}$ of the ratio, to determine whether the new value of $P_{k2}$ is below previous maximum value of $P_{k2}$ and below a threshold $T_{pk}$, and if so to restore at least one of the first, second and third adaptive filters to its previous state.

14. A headset system according to claim 12, configured so that the determination that an interference signal is not present includes a determination that the value of said ratio $P_k$ is below a threshold $T_{pk2}$.

15. A headset system according to claim 1, configured to adapt the weights of the second or third filters by weighting update factors which are inverse functions of respective error outputs $e_{c1}$ of the second filter and $e_{c2}$ of the third filter.

16. A headset system according to claim 4, configured to transform the combined signals into two frequency domain signals which are a signal $S_f$ and an interference signal $I_f$, to transform $S_f$ and $I_f$ into respective modified spectra $P_s$ and $P_i$, and to warp the modified spectra into respective Bark spectra Bs and Bi.

17. A headset system according to claim 16, further configured, prior to said warping, to apply frequency scanning to the modified spectra $P_s$ and $P_i$, and to attenuate in $P_i$ peaks which are found to be common to both.

18. A headset system according to claim 16, further configured to derive a ratio of the sum of the values of $B_s$ over the Bark critical bands up to the voice band upper cutoff, and the sum of the values of $B_s$ over the Bark critical bands at and above the unvoiced bank lower cutoff.

19. A headset system according to claim 18, further configured to derive the ratio above a given threshold, and to amplify the values of $B_s$ above the unvoiced band lower threshold.

20. A headset system according to claim 1, further comprising a speech recognition engine configured to receive the output of the at least one digital signal processing unit.

21. A headset system according to claim 17, further configured for the speech recognition engine to receive from the at least one digital signal processing unit information indicating at least one of:
   a) a direction of a target signal $T_d$,
   b) a signal Energy $E_{r1}$,
   c) a noise threshold used by the at least one digital signal processing unit,
   d) an estimated SINR (target signal to interference ratio) and SNR (target signal to noise ratio),
   e) a signal A' indicating the presence of target speech,
   f) a spectrum of processed speech signal $S_{out}$,
   g) potential speech start and end points, and
   h) an interference signal spectrum, $I_f$.

22. A headset system according to claim 1, in which the headset unit comprises two arms configured to be positioned proximate the mouth of the user and to be positioned on either side of the user's head.

23. A headset system according to claim 22, in which the headset unit is further configured to be supportable by the user's shoulders with the two arms embracing the user's neck.

24. A headset system according to claim 22, in which at least one microphone is provided on a free end of each of the two arms.

25. A method of processing signals received from an array of sensors, including sampling and digitizing the received signals into digital signals, the method comprising:
   filtering the digital signals using a first adaptive filter arranged to enhance a target signal in the digital signals;
   transmitting an output of the first adaptive filter to each of a second adaptive filter and a third adaptive filter, the second adaptive filter being arranged to suppress unwanted interference signals, and the third adaptive filter being arranged to estimate noise signals; and
   combining the outputs of the second and third adaptive filters.

26. A headset system including a base unit and a headset unit for wearing by a user and having a plurality of microphones, the headset unit and the base unit being arranged for mutual wireless communication, and at least one of the base unit and the headset unit comprising at least one digital signal processing unit arranged to perform signal processing in a time domain on audio signals generated by the plurality of microphones, the at least one digital signal processing unit including a first adaptive filter configured to enhance a wanted signal in the audio signals, a second adaptive filter and a third adaptive filter each configured to receive an output of the first adaptive filter, the second adaptive filter being configured to reduce an unwanted interference signal in the audio signals, the third adaptive filter being arranged to estimate noise signals, the headset system being configured:
   so that the second and third adaptive filters are not adapted if it is determined that a target signal is present;
   to determine signal energy at intervals, and to derive at least one noise threshold from a plurality of values of the signal energy, including to determine whether a further signal energy is above the at least one noise threshold; and
   so that the derivation of said at least one noise threshold includes using the plurality of values of the signal energy to derive a histogram representing the statistical frequencies of signal energy values in each of a number of bands, and deriving the at least one noise threshold from a signal energy value $E_{max}$ associated with a band having a highest histogram value.

* * * * *